United States Patent
Lee et al.

(10) Patent No.: US 8,391,382 B2
(45) Date of Patent: Mar. 5, 2013

(54) METHOD AND APPARATUS FOR GENERATING RANGING PREAMBLE CODE IN WIRELESS COMMUNICATION SYSTEM

(75) Inventors: Hyun Woo Lee, Seoul (KR); Yeong Hyeon Kwon, Seoul (KP); Han Gyu Cho, Seoul (KR); Jin Sam Kwak, Seoul (KR); Seung Hee Han, Seoul (KR)

(73) Assignee: LG Electronics Inc., Seoul (KR)

( * ) Notice: Subject to any disclaimer, the term of this patent is extended or adjusted under 35 U.S.C. 154(b) by 331 days.

(21) Appl. No.: 12/835,662

(22) Filed: Jul. 13, 2010

(65) Prior Publication Data

US 2011/0013720 A1    Jan. 20, 2011

Related U.S. Application Data

(60) Provisional application No. 61/225,212, filed on Jul. 14, 2009, provisional application No. 61/225,287, filed on Jul. 14, 2009, provisional application No. 61/227,793, filed on Jul. 23, 2009, provisional application No. 61/255,834, filed on Oct. 28, 2009.

(30) Foreign Application Priority Data

May 11, 2010   (KR) ........................ 10-2010-0043767

(51) Int. Cl.
   *H04L 27/28*   (2006.01)

(52) U.S. Cl. ...................................................... 375/260
(58) Field of Classification Search ................... 375/260
   See application file for complete search history.

(56) References Cited

U.S. PATENT DOCUMENTS

2011/0051667 A1*   3/2011   Park et al. ..................... 370/328

FOREIGN PATENT DOCUMENTS

| CN | 1960352 | 5/2007 |
| CN | 101034931 | 9/2007 |
| CN | 101404636 | 4/2009 |
| KR | 10-2009-0074105 | 7/2009 |

* cited by examiner

Primary Examiner — Kevin Kim
(74) Attorney, Agent, or Firm — Lee, Hong, Degerman, Kang & Waimey

(57) ABSTRACT

A method and apparatus of generating a ranging preamble code in a wireless communication system is provided. A mobile station (MS) receives ranging channel information, and generates the ranging preamble code by selecting one of a plurality of candidate ranging preamble codes based on the ranging channel information. The plurality of candidate ranging preamble codes are based on a Zadoff-Chu (ZC) sequence of which a length is $N_{RP}$ and a root index is $r_p$, and The ranging channel information comprises at least one of a start root index $r_0$ among root indices of the plurality of candidate ranging preamble codes and a control parameter y indicating the start root index.

18 Claims, 11 Drawing Sheets

FIG. 5
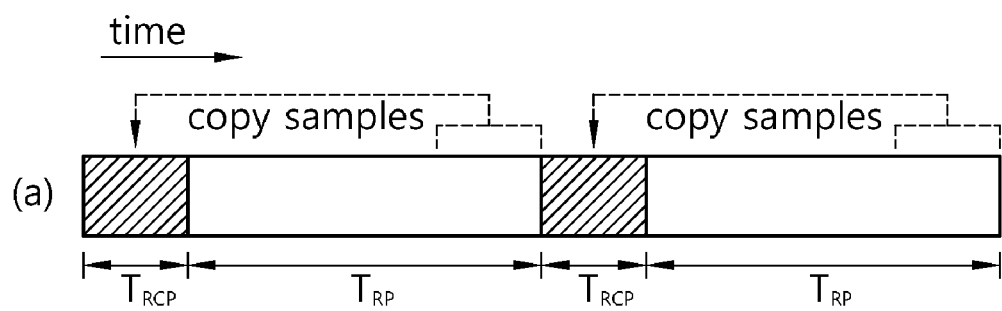
(a)
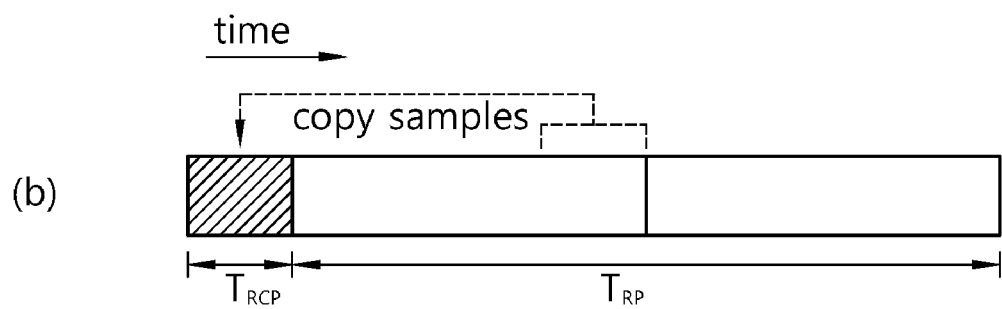
(b)
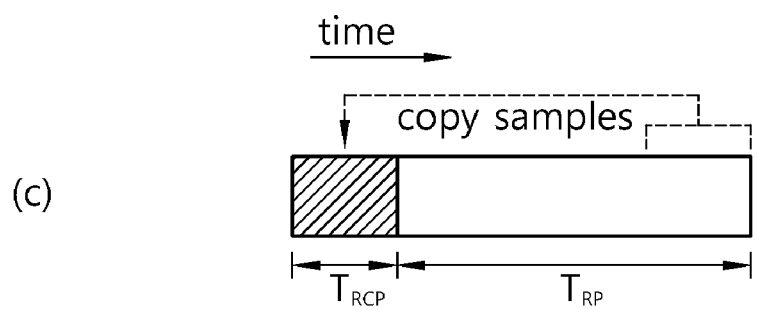
(c)

FIG. 9

| | |
|---|---|
| FIRST CANDIDATE RANGING PREAMBLE CODE | $a_1$ $a_2$ $\cdots$ $a_{10}$ $a_{11}$ $\cdots$ $a_{19}$ $a_{20}$ |
| SECOND CANDIDATE RANGING PREAMBLE CODE | $a_{11}$ $a_{12}$ $\cdots$ $a_{20}$ $a_1$ $\cdots$ $a_{10}$ |
| THIRD CANDIDATE RANGING PREAMBLE CODE | $b_1$ $b_2$ $\cdots$ $b_{10}$ $b_{11}$ $\cdots$ $b_{20}$ |
| FOURTH CANDIDATE RANGING PREAMBLE CODE | $b_{11}$ $b_{12}$ $\cdots$ $b_{20}$ $b_1$ $\cdots$ $b_{10}$ |
| FIFTH CANDIDATE RANGING PREAMBLE CODE | $c_1$ $c_2$ $\cdots$ $c_{10}$ $c_{11}$ $\cdots$ $c_{20}$ |

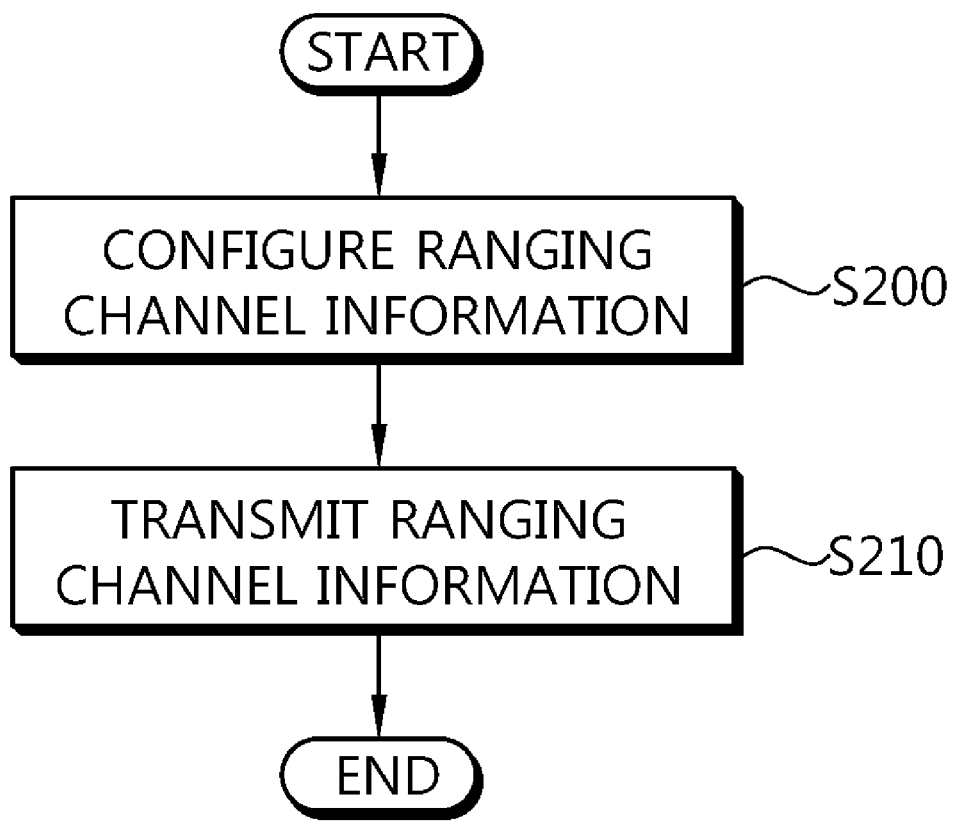

METHOD AND APPARATUS FOR GENERATING RANGING PREAMBLE CODE IN WIRELESS COMMUNICATION SYSTEM

CROSS-REFERENCE TO RELATED APPLICATIONS

Pursuant to 35 U.S.C. §120, this application claims the benefit of priority of U.S. Provisional application Nos. 61/225,212, filed on Jul. 14, 2009, 61/225,287, filed on Jul. 14, 2009, 61/227,793, filed on Jul. 23, 2009, and 61/255,834 filed on Oct. 28, 2009, and, pursuant to 35 U.S.C. §119(a), this application claims the benefit of earlier filing date and right of priority to Korean Patent application No. 10-2010-0043767 filed on May 11, 2010, all of which are incorporated by reference herein in their entirety.

BACKGROUND OF THE INVENTION

1. Field of the Invention

The present invention relates to wireless communications, and more particularly, to a method and apparatus for generating a ranging preamble code in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

An uplink control channel can be defined for transmission of an uplink control signal. Examples of the uplink control channel are various such as a fast feedback channel, a hybrid automatic repeat request (HARQ) feedback channel, a sounding channel, a ranging channel, a bandwidth request channel, etc. The fast feedback channel carries feedback of a channel quality indicator (CQI) and/or multiple-input multiple-output (MIMO) information, and can be classified into a primary fast feedback channel and a secondary fast feedback channel. The HARQ feedback channel is a channel for transmitting an acknowledgement (ACK)/non-acknowledgement (NACK) signal as a response for data transmission. The sounding channel can be used as an uplink channel response for closed-loop MIMO transmission and uplink scheduling. The bandwidth request channel is a channel for requesting a radio resource for transmitting a control signal or uplink data to be transmitted by a mobile station (MS).

The ranging channel can be used for uplink synchronization. The ranging channel can be classified into a ranging channel for a non-synchronized MS and a ranging channel for a synchronized MS. The ranging channel for the non-synchronized MS can be used for ranging on a target base station (BS) during initial network entry and handover. In a subframe in which the ranging channel for the non-synchronized MS is to be transmitted, the MS may not transmit any uplink burst or uplink control channel. The ranging channel for the synchronized MS can be used for periodic ranging. An MS which has already been synchronized with the target BS can transmit a ranging signal for the synchronized MS.

The ranging channel includes a ranging preamble code. An MS can transmit the ranging channel by selecting one ranging preamble code from an available ranging preamble code set.

SUMMARY OF THE INVENTION

It is, therefore, an object of the present invention to provide a method and apparatus for generating a ranging preamble code in a wireless communication system.

In an aspect, a method of generating a ranging preamble code in a wireless communication system is provided. The method include receiving ranging channel information, and generating the ranging preamble code by selecting one of a plurality of candidate ranging preamble codes based on the ranging channel information, wherein the plurality of candidate ranging preamble codes are based on a Zadoff-Chu (ZC) sequence of which a length is $N_{RP}$ and a root index is $r_p$, and wherein the ranging channel information comprises at least one of a start root index $r_0$ among root indices of the plurality of candidate ranging preamble codes and a control parameter y indicating the start root index. The root index $r_p$ of a candidate ranging preamble code with an index p among the plurality of candidate ranging preamble codes and a cyclic shift index $s_p$ per root index may be determined by $$r_p = \mathrm{mod}((1 - 2 \cdot \mathrm{mod}(\lfloor p/M \rfloor, 2)) \cdot (\lfloor p/M/2 \rfloor + r_0), N_{RP})$$
$$s_p = \mathrm{mod}(p, M)$$
$$p = 0, 1, \ldots, N_{TOTAL} - 1,$$

where $N_{TOTAL}$ is a total number of candidate ranging preamble codes, M is the number of codes which are cyclic shifted for each root index of the ZC sequence, and $N_{RP}$ is a length of the ranging preamble code. The value $N_{TOTAL}$ may be determined to a sum of a contention-based candidate ranging preamble code count $N_{cont}$ determined by a mobile station and a dedicated ranging preamble code count $N_{dedi}$ allocated by a base station to a specific mobile station. The value $r_p$ may start from the start root index $r_0$ and may be allocated in the order of $N_{RP}-r_0$, $r_0+1$, $N_{RP}-(r_0+1)$, and so on. The ranging channel information may be broadcast by using a secondary superframe header (S-SFH) SP1. The start root index $r_0$ may be determined to either $r_0=4y+1$ or $r_0=16y+1$ on the basis of the control parameter y. The start root index $r_0$ may be determined to $r_0=6y+1$ on the basis of the control parameter y. The control parameter y may be one of integers ranged from 0 to 15. A candidate ranging preamble code with an index p among the plurality of candidate ranging preamble codes may be determined by $$x_p(k) = \exp\left(-j \cdot \pi \frac{r_p \cdot k(k+1) + 2 \cdot k \cdot s_p \cdot N_{CS}}{N_{RP}}\right), k = 0, 1, \ldots, N_{RP}-1,$$

where $r_p$ is a root index of a ZC sequence, $s_p$ is a cyclic shift index for each root index, and $N_{CS}$ is a cyclic shift unit based on a cell size in a time domain and is defined as $N_{CS}=\lfloor N_{RP}/M \rfloor$, where M is the number of codes which are cyclic shifted for each root index of a ZC sequence and $N_{RP}$ is a length of the ranging preamble code. A candidate ranging preamble code with an index p among the plurality of candidate ranging preamble codes may be determined by $$x_p(n, k) = \exp\left(-j \cdot \pi\left(\frac{r_p \cdot (k+71n)(k+71n+1)}{211} + \frac{2k \cdot s_p \cdot N_{TCS}}{N_{FFT}}\right)\right),$$
$$k = 0, 1, \ldots, N_{RP}-1; \quad n = 0, 1, 2$$

where $r_p$ is a root index of a ZC sequence, $s_p$ is a cyclic shift index for each root index, $N_{TCS}$ is a cyclic shift unit in a time domain for each orthogonal frequency division multiplexing (OFDM) symbol depending on a cyclic prefix (CP) length, and $N_{FFT}$ is a fast Fourier transform (FFT) size depending on a bandwidth. The method may further include transmitting a ranging channel comprising the ranging preamble code.

In another aspect, a method of transmitting ranging channel information in a wireless communication system is provided. The method include configuring the ranging channel information, and transmitting the ranging channel information, wherein a plurality of candidate ranging preamble codes are determined by the ranging channel information, wherein one of the plurality of candidate ranging preamble codes is generated as a ranging preamble code, wherein the plurality of candidate ranging preamble codes are based on a Zadoff-Chu (ZC) sequence of which a length is $N_{RP}$ and a root index is $r_p$, and wherein the ranging channel information comprises at least one of a start root index $r_0$ among root indices of the plurality of candidate ranging preamble codes and a control parameter y indicating the start root index. The value $N_{TOTAL}$ may be determined to a sum of a contention-based candidate ranging preamble code count $N_{cont}$ determined by a mobile station and a dedicated ranging preamble code count $N_{dedi}$ allocated by a base station to a specific mobile station. The value $r_p$ may start from the start root index $r_0$ and may be allocated in the order of $N_{RP}-r_0$, $r_0+1$, $N_{RP}-(r_0+1)$, and so on. The ranging channel information may be broadcast by using a secondary superframe header (S-SFH) SP1. The start root index $r_0$ may be determined to either $r_0=4y+1$ or $r_0=16y+1$ on the basis of the control parameter y. The start root index $r_0$ may be determined to $r_0=6y+1$ on the basis of the control parameter y. The control parameter y may be one of integers ranged from 0 to 15.

In another aspect, an apparatus for generating a ranging preamble code in a wireless communication system is provided. The apparatus include a radio frequency (RF) unit configured to receiving ranging channel information from a base station, and a processor, coupled to the RF unit, and configured to generate the ranging preamble code by selecting one of a plurality of candidate ranging preamble codes based on the ranging channel information, wherein the plurality of candidate ranging preamble codes are based on a Zadoff-Chu (ZC) sequence of which a length is $N_{RP}$ and a root index is $r_p$, and wherein the ranging channel information comprises at least one of a start root index $r_0$ among root indices of the plurality of candidate ranging preamble codes and a control parameter y indicating the start root index.

BRIEF DESCRIPTION OF THE DRAWINGS

FIG. 5 shows an exemplary structure of a ranging channel for a non-synchronized MS.
FIG. 9 shows an example of a process of determining a candidate ranging preamble code according to the proposed ranging preamble code generation method.
FIG. 10 shows the proposed ranging channel information transmission method according to an embodiment of the present invention.

DESCRIPTION OF EXEMPLARY EMBODIMENTS

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3$^{rd}$ Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16e.

Figure 1:
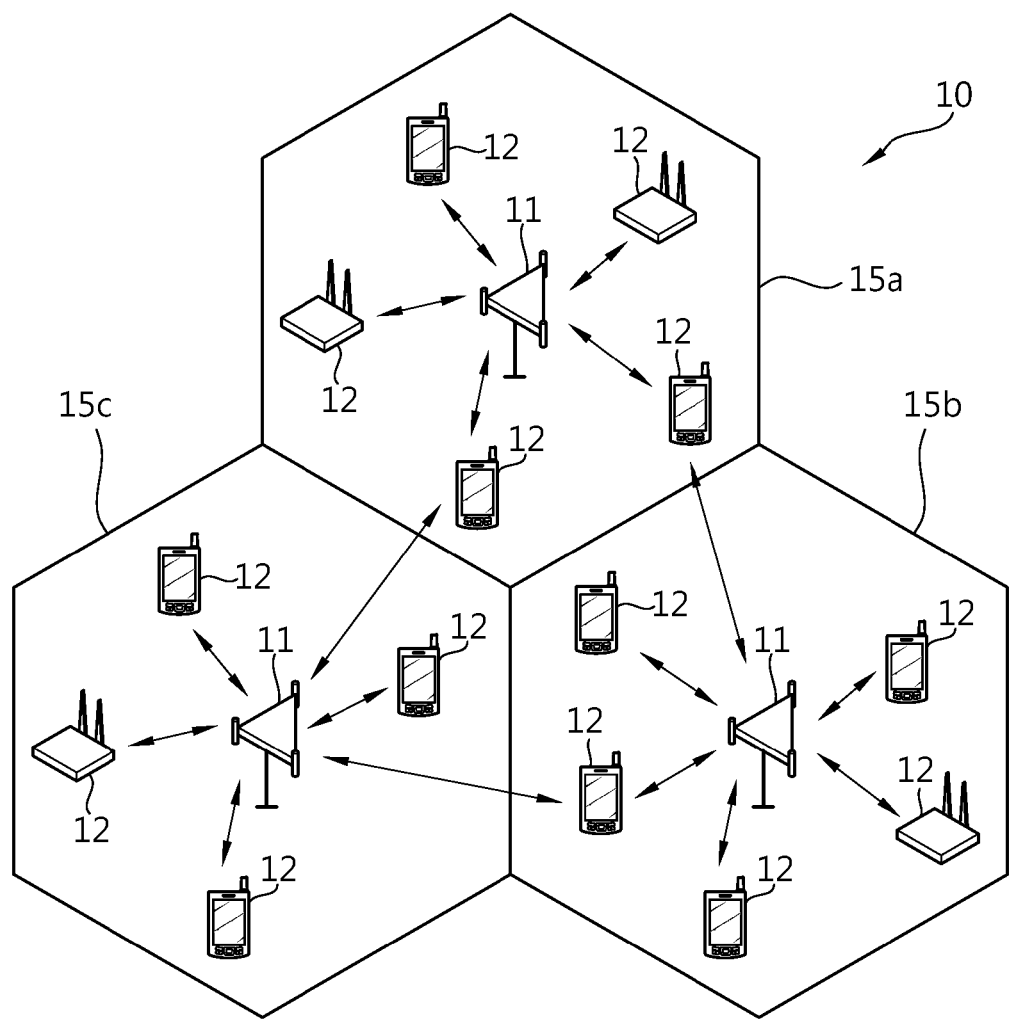
FIG. 1 shows a wireless communication system.

FIG. 1 shows a wireless communication system.

Referring to FIG. 1, the wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
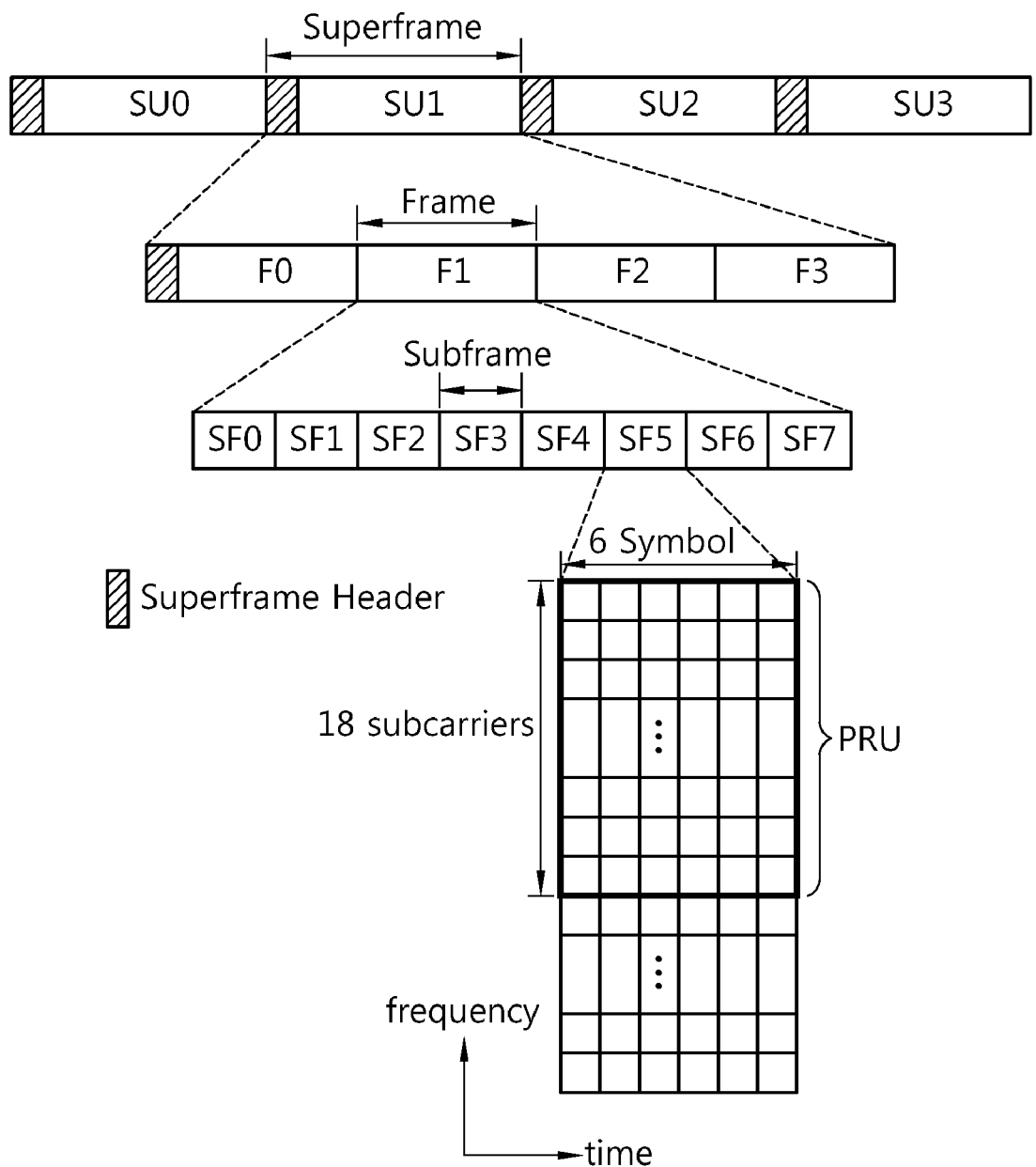
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

The SFH can carry an essential system parameter and system configuration information. The SFH may be located in a first subframe of the SF. The SFH can be classified into a primary-SFH (P-SFH) and a secondary-SFH (S-SFH). The P-SFH and the S-SFH may be transmitted in every superframe.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDM symbols. However, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

One orthogonal frequency division multiplexing (OFDM) symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDM symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| | | 5 | 7 | 8.75 | 10 | 20 |
|---|---|---|---|---|---|---|
| Channel bandwidth, BW(MHz) | | 5 | 7 | 8.75 | 10 | 20 |
| Sampling factor, n | | 28/25 | 8/7 | 8/7 | 28/25 | 28/25 |
| Sampling frequency, Fs(MHz) | | 5.6 | 8 | 10 | 11.2 | 22.4 |
| FFT size, $N_{FFT}$ | | 512 | 1024 | 1024 | 1024 | 2048 |
| Subcarrier spacing, $\Delta f$(kHz) | | 10.94 | 7.81 | 9.77 | 10.94 | 10.94 |
| Useful symbol time, Tb(μs) | | 91.4 | 128 | 102.4 | 91.4 | 91.4 |
| G = 1/8 | Symbol time, Ts(μs) | 102.857 | 144 | 115.2 | 102.857 | 102.857 |
| | FDD Number of OFDMA symbols per 5 ms frame | 48 | 34 | 43 | 48 | 48 |

TABLE 1-continued

|  |  |  |  |  |  |  |  |
|---|---|---|---|---|---|---|---|
|  |  | Idle time(μs) | 62.857 | 104 | 46.40 | 62.857 | 62.857 |
|  | TDD | Number of OFDMA symbols per 5 ms frame | 47 | 33 | 42 | 47 | 47 |
|  |  | TTG + RTG(μs) | 165.714 | 248 | 161.6 | 165.714 | 165.714 |
| G = 1/16 |  | Symbol time, Ts(μs) | 97.143 | 136 | 108.8 | 97.143 | 97.143 |
|  | FDD | Number of OFDMA symbols per 5 ms frame | 51 | 36 | 45 | 51 | 51 |
|  |  | Idle time(μs) | 45.71 | 104 | 104 | 45.71 | 45.71 |
|  | TDD | Number of OFDMA symbols per 5 ms frame | 50 | 35 | 44 | 50 | 50 |
|  |  | TTG + RTG(μs) | 142.853 | 240 | 212.8 | 142.853 | 142.853 |
| G = 1/4 |  | Symbol time, Ts(μs) | 114.286 | 160 | 128 | 114.286 | 114.286 |
|  | FDD | Number of OFDMA symbols per 5 ms frame | 43 | 31 | 39 | 43 | 43 |
|  |  | Idle time(μs) | 85.694 | 40 | 8 | 85.694 | 85.694 |
|  | TDD | Number of OFDMA symbols per 5 ms frame | 42 | 30 | 38 | 42 | 42 |
|  |  | TTG + RTG(μs) | 199.98 | 200 | 136 | 199.98 | 199.98 |
| Number of Guard subcarriers | Left | | 40 | 80 | 80 | 80 | 160 |
|  | Right | | 39 | 79 | 79 | 79 | 159 |
| Number of used subcarriers | | | 433 | 865 | 865 | 865 | 1729 |
| Number of PRU in type-1 sub frame | | | 24 | 48 | 48 | 48 | 96 |

In Table 1, $N_{FFT}$ denotes a smallest power of 2 greater than $N_{used}$. A sampling factor is defined as $F_s=\text{floor}(n \cdot BW/8000) \times 8000$. A subcarrier spacing is defined as $\Delta f = Fs/N_{FFT}$. A useful symbol time is defined as $Tb=1/\Delta f$. A CP time is defined as $Tg=G \cdot Tb$. An OFDMA symbol time is defined as $Ts=Tb+Tg$. A sampling time is defined as $Tb/N_{FFT}$.

A subframe includes a plurality of physical resource units (PRUs) in the frequency domain. The PRU is a basic physical unit for resource allocation, and consists of a plurality of consecutive OFDM symbols in the time domain and a plurality of consecutive subcarriers in the frequency domain. The number of OFDM symbols included in the PRU may be equal to the number of OFDM symbols included in one subframe. Therefore, the number of OFDM symbols in the PRU can be determined according to a subframe type. For example, when one subframe consists of 6 OFDM symbols, the PRU may be defined with 18 subcarriers and 6 OFDM symbols.

A logical resource unit (LRU) is a basic logical unit for distributed resource allocation and contiguous resource allocation. The LRU is defined with a plurality of OFDM symbols and a plurality of subcarriers, and includes pilots used in the PRU. Therefore, a desired number of subcarriers for one LRU depends on the number of allocated pilots.

A distributed logical resource unit (DLRU) may be used to obtain a frequency diversity gain. The DLRU includes a distributed subcarrier group in one frequency partition. The DRU has the same size as the PRU. One subcarrier is a basic unit of constituting the DRU.

A contiguous logical resource unit (CLRU) may be used to obtain a frequency selective scheduling gain. The CLRU includes a localized subcarrier group. The CLRU has the same size as the PRU.

A superframe header (SFH) can carry an essential system parameter and system configuration information. The SFH may be located in a first subframe in a superframe. The SFH may occupy last 5 OFDM symbols of the first subframe. The SFH can be classified into a primary-SFH (P-SFH) and a secondary-SFH (S-SFH). The P-SFH may be transmitted in every superframe. The S-SFH may be transmitted in two consecutive superframes. According to importance of information to be transmitted, the S-SFH can be classified into an S-SFH SP1, an S-SFH SP2, and an S-SFH SP3. The S-SFH SP1 may include information on a ranging channel and the number of hybrid automatic repeat request (HARM) feedback channels among uplink control channels, resource mapping information such as subband partitioning and frequency partitioning, legacy support information for the support of an 802.16e mobile station (MS), etc. The S-SFH SP2 may include an uplink bandwidth and resource mapping information. The S-SFH SP3 may include information on a transmission period of the S-SFH, information on a bandwidth request channel and a feedback channel among the uplink control channels, etc.

Figure 3:
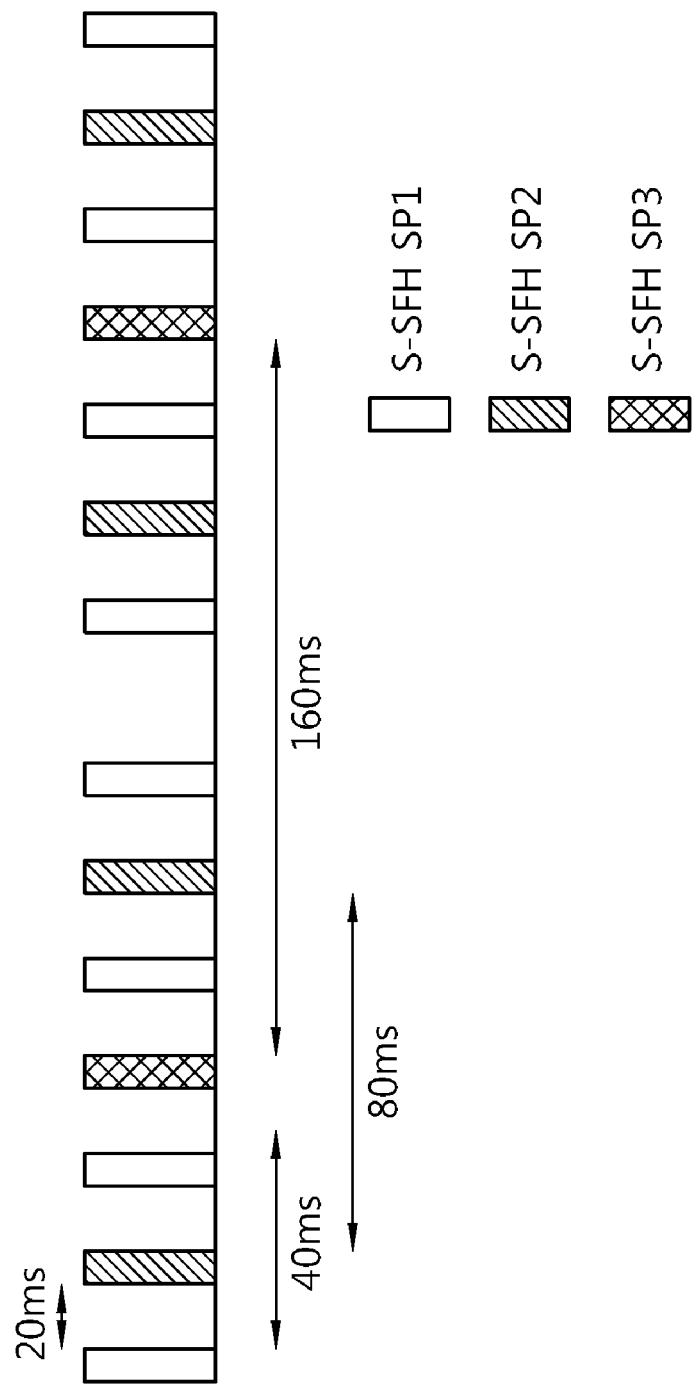
FIG. 3 shows an example of a transmission period of an S-SFH.

FIG. 3 shows an example of a transmission period of an S-SFH. S-SFHs SP1, SP2, and SP3 may be transmitted in different periods. Since information transmitted using the S-SFH SP1 has the highest importance, the S-SFH SP1 may be transmitted with the shortest period, and the S-SFH SP3 may be transmitted with the longest period. The transmission periods of the S-SFHs SP1, SP2, and SP3 may be respectively 40 ms, 80 ms, and 160 ms (or 320 ms). The transmission periods of the S-SFHs SP1, SP2, and SP3 may be indicated by an SP scheduling periodicity information field of the S-SFH SP3.

Figure 4:
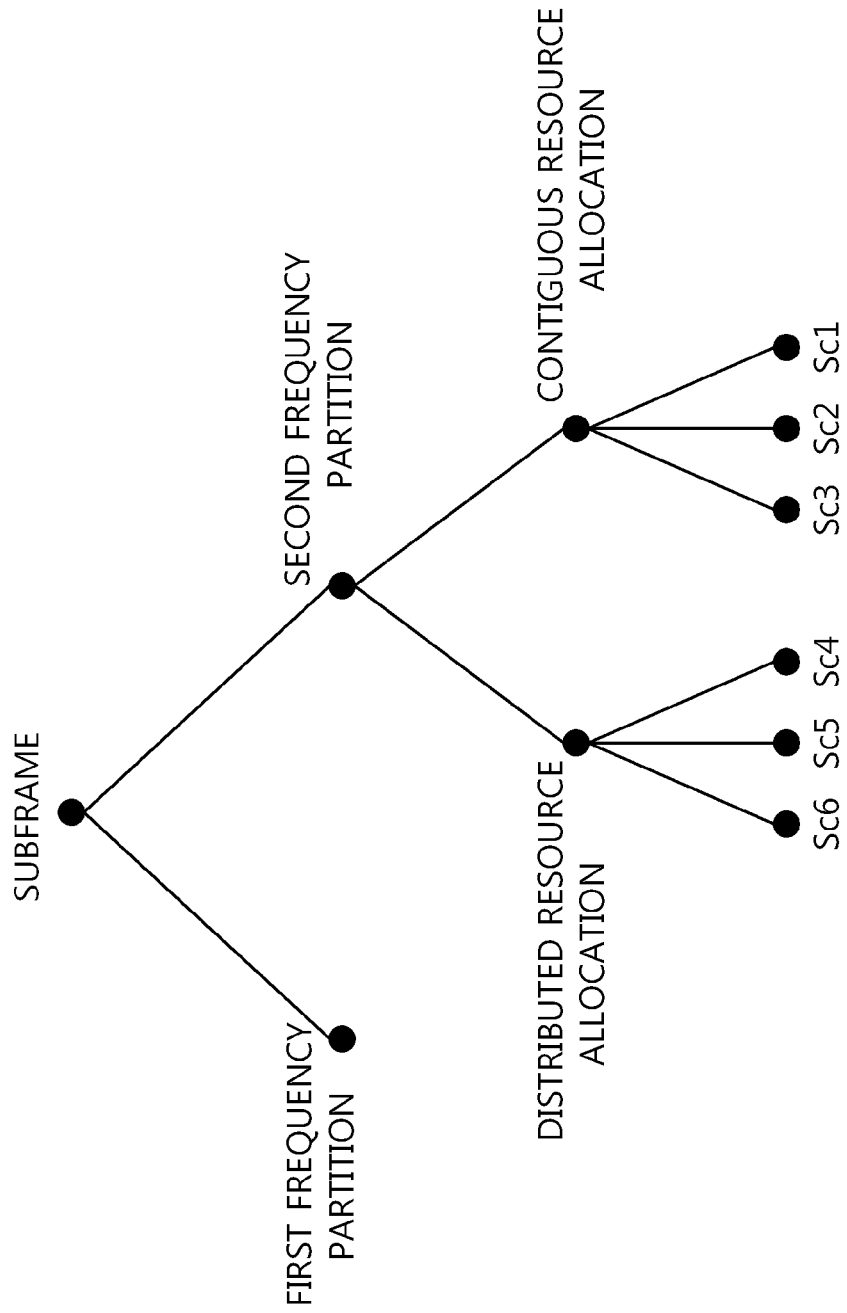
FIG. 4 shows an example of a uplink resource structure.

FIG. 4 shows an example of a uplink resource structure.

Referring to FIG. 4, a uplink subframe can be divided into at least one FP. Herein, the subframe is divided into two FPs (i.e., FP1 and FP2) for example. However, the number of FPs in the subframe is not limited thereto. The number of FPs can be 4 at most. Each FP can be used for other purposes such as FFR.

Each FP consists of at least one PRU. Each FP may include distributed resource allocation and/or contiguous resource allocation. Herein, the second FP (i.e., FP2) includes the distributed resource allocation and the contiguous resource allocation. 'Sc' denotes a subcarrier.

A ranging channel for a non-synchronized MS may be used for ranging on a target base station (BS) during handover or initial network entry of the MS. The ranging channel for the non-synchronized MS may include a ranging preamble (RP) with a length $T_{RP}$ and a ranging cyclic prefix (RCP) with a length $T_{RCP}$ in a time domain. $T_{RP}$ may vary depending on $\Delta f_{RP}$ which is a ranging subcarrier spacing. The ranging channel may be allocated to one subband including 4 contiguous CLRUs.

FIG. 5 shows an exemplary structure of a ranging channel for a non-synchronized MS. A ranging channel of FIG. 5-(a) has a format in which one RCP and one RP are repeated once. A ranging channel of FIG. 5-(b) consists of one RCP and two RPs. A ranging channel of FIG. 5-(c) consists of one RCP and one RP.

Figure 6:
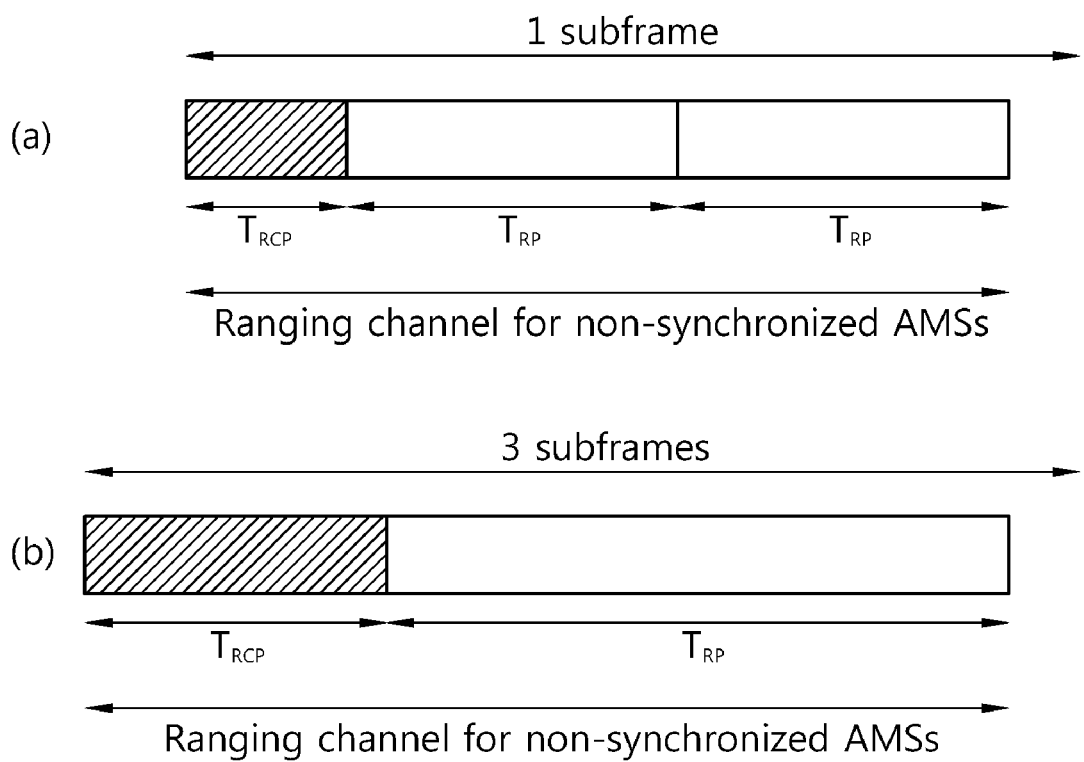
FIG. 6 shows another exemplary structure of a ranging channel for a non-synchronous MS.

FIG. 6 shows another exemplary structure of a ranging channel for a non-synchronous MS. The ranging channel for the non-synchronous MS may be allocated to one or three subframes according to a ranging channel format. A ranging channel structure of FIG. 6-(a) corresponds to that of FIG. 5-(b). A ranging channel structure of FIG. 6-(b) corresponds to that of FIG. 5-(c). An RCP is a copy of a rear part of an RP, and phase discontinuity between the RCP and the RP does not occur. A start point at which transmission of the ranging channel starts is aligned to a start point of an uplink subframe corresponding to a downlink synchronization obtained by a downlink preamble in an MS. A time remaining after the ranging channel is transmitted in a subframe may be reserved to avoid interference between contiguous subframes. In a subframe in which the ranging channel for the non-synchronous MS is to be transmitted, the MS may not transmit any uplink burst or uplink control channel.

Table 2 shows an example of a parameter and a format of the ranging channel.

TABLE 2

| Format | Ranging Channel Structure | $T_{RCP}$ | $T_{RP}$ | $\Delta f_{RP}$ |
|---|---|---|---|---|
| 0 | FIG. 5-(a) | Tg + k * Tb | 2 * Tb | $\Delta f/2$ |
| 1 | FIG. 5-(c) | | | |
| 2 | FIG. 5-(b) | K1 * Tg + K2 * Tb | 2 * 2 * Tb | |
| 3 | FIG. 5-(c) | 7 * Tg + Tb | 8 * Tb | $\Delta f/8$ |

Table 3 shows another example of the parameter and the format of the ranging channel.

TABLE 3

| Format | Ranging Channel Structure | $T_{RCP}$ | $T_{RP}$ | $\Delta f_{RP}$ |
|---|---|---|---|---|
| 0 | FIG. 5-(b) | K1 * Tg + K2 * Tb | 2 * Tb | $\Delta f/2$ |
| 1 | FIG. 5-(c) | 3.5 * Tg + 7 * Tb | 8 * Tb | $\Delta f/8$ |

Tb, Tg, and $\Delta f$ can be respectively defined as a useful symbol duration, a CP time, and a subcarrier spacing by Table 1. In Table 2, $T_{RCP}$ of the ranging channel formats 0 and 1 may vary depending on a subframe type and an OFDMA parameter of Table 1. For example, $k=[\{[N_{sym} \cdot T_s - 2 \cdot (T_{RP} + T_g)]/3\} \cdot F_s]/N_{FFT}$. $N_{sym}$ denotes the number of OFDM symbols included in one subframe. $F_s$ and $N_{FFT}$ can be defined by Table 1. $T_{RP}$ of the ranging channel format 2 of Table 2 denotes a total length of a repeated ranging preamble. Further, $T_{RCP}$ of the ranging channel format of Table 2 and the ranging channel format of Table 3 may also vary depending on the subframe type and the OFDMA parameter of Table 1. In this case, k1 may be defined as $(N_{sym}+1)/2$, and k2 may be defined as $(N_{sym}-4)/2$.

The repeated RCP and RP in the ranging channel format of Table 2 may be used as one ranging opportunity in a subframe. The ranging channel format 2 includes one RCP and repeated RPs in the subframe. The ranging channel format 1 includes one RCP and one RP as a part of the ranging channel format 0. In this case, the ranging channel format 1 may have two ranging opportunities in one subframe. The ranging channel format 3 has the same structure as the ranging channel format 1, but has a different length.

A ranging channel for a synchronized MS may be used for periodic ranging. An MS which has already been synchronized with a target BS may transmit a ranging signal for the synchronized MS. The ranging channel for the synchronized MS may occupy 72 subcarriers and 6 OFDM symbols starting from a first OFDM symbol of one subframe. The ranging channel for the synchronized MS may occupy 72 subcarriers and 3 OFDM symbols, and may consist of a basic unit generated from a ranging preamble code and a repeated unit which is one time repetition of the basic unit.

Figure 7:
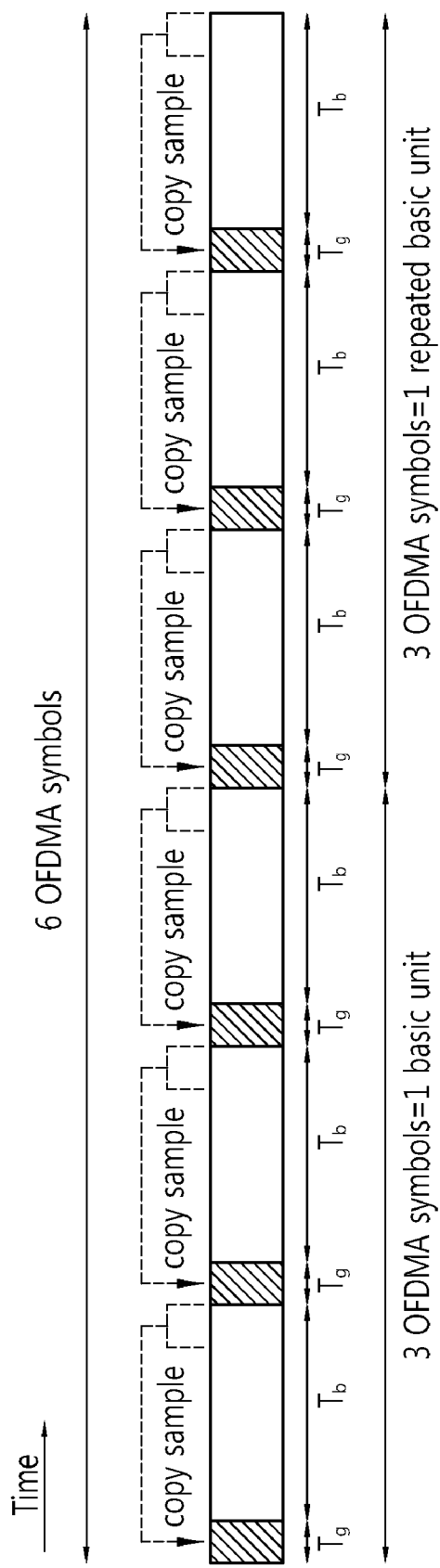
FIG. 7 shows an exemplary structure of a ranging channel for a synchronized MS.

FIG. 7 shows an exemplary structure of a ranging channel for a synchronized MS. Tb denotes a useful symbol time of Table 1. Tg denotes a CP time. First three OFDM symbols are allocated to a basic unit, and next three OFDM symbols are allocated to a repeated unit.

A ranging preamble constituting the ranging channel may be transmitted using a ranging preamble code. Various types of sequences can be used as the ranging preamble code. In a ranging channel for a non-synchronized MS, a ranging preamble code can be classified into an initial access ranging preamble code and a handover ranging preamble code. The initial access ranging preamble code is used for initial network access. The handover ranging preamble code is used for ranging onto a target BS during handover.

A Zadoff-Chu (ZC) sequence usable as the ranging preamble code can be defined by Equation 1 when a root index is r and a length is $N_{zc}$.

[Equation 1]

$$x_r(k) = \begin{cases} \exp\left(\frac{-j2\pi r}{N_{ZC}}\left(\frac{k^2}{2} + qk\right)\right), & k = 0, 1, \ldots, N_{ZC} - 1 \text{ if } N_{ZC} \text{ is even.} \\ \exp\left(\frac{-j2\pi r}{N_{ZC}}\left(\frac{k(k+1)}{2} + qk\right)\right), & k = 0, 1, \ldots, N_{ZC} - 1 \text{ if } N_{ZC} \text{ is odd.} \end{cases}$$

In Equation 1, q can be any natural number. If q=0, a ZC sequence with an odd length can be expressed by Equation 2.

$$x_r(k) = \exp\left(-j\frac{\pi r k(k+1)}{N_{ZC}}\right), \quad k = 0, 1, \ldots, N_{ZC} - 1 \quad \text{[Equation 2]}$$

In addition, a generalized chirp-like (GCL) sequence with a root index r and a length $N_{GCL}$ can be defined by Equation 3.

$$x_r(k) = \exp\left(-j2\pi r \frac{k(k+q)}{N_{GCL}}\right), k = 0, 1, \ldots, N_{GCL} - 1 \quad \text{[Equation 3]}$$

In Equation 3, q can be any natural number.

To transmit a sequence such as the ZC code, the GCL code, etc., a root index of the sequence needs to be transmitted. For example, the ZC code used for a physical random access channel (PRACH) in a long term evolution (LTE) system has $N_{ZC}=839$. Thus, to broadcast a root index logically ordered in a cell, a 10-bit signal needs to be transmitted.

Meanwhile, in the ZC sequence, a root index r and a root index $N_{ZC}-r$ have a complex conjugate relation with each other, as shown in Equation 4.

$$x_{N_{ZC}-r}(k) = \begin{cases} \exp\left(\frac{-j2\pi(N_{ZC}-r)}{N_{ZC}}\left(\frac{k^2}{2}+qk\right)\right), k = 0, 1, \ldots, N_{ZC}-1 \text{ if } N_{ZC} \text{ is even.} \\ \exp\left(\frac{-j2\pi(N_{ZC}-r)}{N_{ZC}}\left(\frac{k(k+1)}{2}+qk\right)\right), k = 0, 1, \ldots, N_{ZC}-1 \text{ if } N_{ZC} \text{ is odd.} \end{cases}$$

[Equation 4]

$$= \begin{cases} \exp\left(-j2\pi\left(\frac{k^2}{2}+qk\right)\right)\exp\left(\frac{j2\pi r}{N_{ZC}}\left(\frac{k^2}{2}+qk\right)\right) \\ \exp\left(-j2\pi\left(\frac{k(k+1)}{2}+qk\right)\right)\exp\left(\frac{j2\pi r}{N_{ZC}}\left(\frac{k(k+1)}{2}+qk\right)\right) \end{cases}$$

$$= \begin{cases} \exp\left(-j2\pi\left(\frac{k^2}{2}+qk\right)\right)\exp\left(\frac{j2\pi r}{N_{ZC}}\left(\frac{k^2}{2}+qk\right)\right) \\ \exp\left(-j2\pi\left(\frac{k(k+1)}{2}+qk\right)\right)\exp\left(\frac{j2\pi r}{N_{ZC}}\left(\frac{k(k+1)}{2}+qk\right)\right) \end{cases}$$

$$= \begin{cases} x_r^*(k), \quad k = 0, 1, \ldots, N_{ZC}-1 \text{ if } N_{ZC} \text{ is even.} \\ x_r^*(k), \quad k = 0, 1, \ldots, N_{ZC}-1 \text{ if } N_{ZC} \text{ is odd.} \end{cases}$$

Similarly, in the GCL sequence, a root index r and a root index $N_{GCL}-r$ have a complex conjugate relation with each other, as shown in Equation 5.

$$x_{N_{GCL}-r}(k) = \exp\left(-j2\pi(N_{GCL}-r)\frac{k(k+q)}{N_{GCL}}\right),$$
$$k = 0, 1, \ldots, N_{GCL}-1$$

[Equation 5]

$$= \exp(-j2\pi k(k+q))\exp\left(j2\pi r \frac{k(k+q)}{N_{GCL}}\right),$$
$$k = 0, 1, \ldots, N_{GCL}-1$$

$$= x_{N_{GCL}-r}^*(k)$$

The complex conjugate relation shown in Equation 4 or Equation 5 can be applied irrespective of whether a sequence is defined in a time domain or in a frequency domain.

When a code is determined by using the sequence having the complex conjugate relation, complexity can decrease in a receiving end. It is assumed that the sequence having the complex conjugate relation is defined in the frequency domain. If a received frequency-domain signal is y(k), a conjugate of a code $x_a(k)$ can be multiplied as shown in Equation 6 to detect a code $x_a(k)$ with a root index a.

$$Z_a(k) = Y(k)x_a^*(k)$$ [Equation 6]
$$= (u_k + jv_k)(a_k - jb_k)$$
$$= (u_k a_k + v_k b_k) + j(v_k a_k - u_k b_k),$$
$$k = 0, 1, \ldots, N_{ZC}-1$$
$$= (c+d) + j(e-f), \quad k = 0, 1, \ldots, N_{ZC}-1$$

In addition, a conjugate of a code $x_{NZC-a}(k)$ can be multiplied as shown in Equation 7 to detect a code $x_{NZC-a}(k)$ with a root index $N_{ZC}-a$.

$$Z_a(k) = Y(k)x_{NZC-a}^*(k)$$ [Equation 7]
$$= Y(k)x_a(k)$$
$$= (u_k + jv_k)(a_k + jb_k)$$
$$= (u_k a_k - v_k b_k) + j(v_k a_k + u_k b_k),$$

-continued
$$k = 0, 1, \ldots, N_{ZC}-1$$
$$= (c-d) + j(e+f), \quad k = 0, 1, \ldots, N_{ZC}-1,$$

It can be seen that the result of Equation 6 for detecting the code $x_a(k)$ and the result of Equation 7 for detecting the code $x_{NZC-a}(k)$ are correlated to each other. That is, values c, d, e, and f to be obtained as a result of the detection of FIG. 6 can be obtained as a result of the detection of Equation 7. Therefore, two codes can be both detected by using either the code $x_a(k)$ with the root index a or the code $x_{NZC-a}(k)$ with the root index $N_{ZC}-a$. The code $x_{NZC-a}(k)$ with the root index $N_{ZC}-a$ can be detected by using a value obtained as a result of detecting the code $x_a(k)$ with the root index a in Equation 6. On the contrary, the code $x_a(k)$ with the root index a can be detected by using a result of detecting the code $x_{NZC-a}(k)$ with the root index $N_{ZC}-a$ in Equation 7.

As such, since a ZC sequence with a root index r and a ZC sequence with a root index $N_{ZC}-r$ have a correlation with each other, when a sequence is transmitted based on a plurality of root indices in a cell, a sequence with a root index r and a sequence with a root index $N_{ZC}-r$ can be allocated in pair. That is, it can be said that the root index r and the root index $N_{ZC}-r$ have a pair allocation relation with each other. Therefore, when transmitting root indices, information on root indices to be transmitted can be configured such that only a half of the root indices are indicated without having to indicate all possible root indices. For example, in a ZC sequence of which a root index ranges from 1 to 138, a ZC sequence with a root index 1 and a ZC sequence with a root index 138 have a pair allocation relation with each other. Therefore, a signaling overhead can be reduced when the sequence is transmitted by using the root index 1 instead of using the root index 138.

Figure 8:
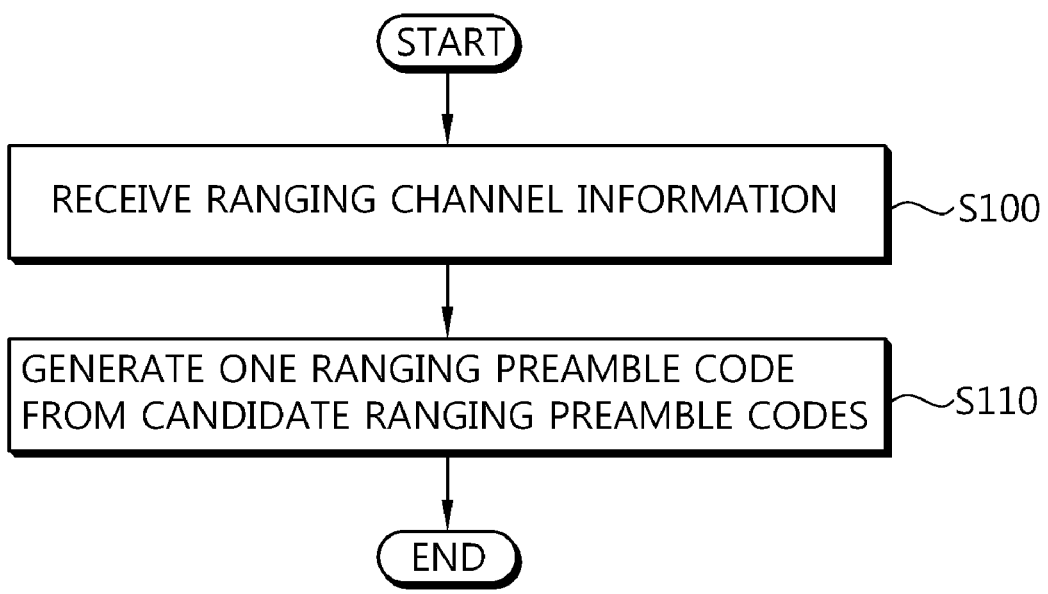
FIG. 8 shows the proposed ranging preamble code generation method according to an embodiment of the present invention.

FIG. 8 shows the proposed ranging preamble code generation method according to an embodiment of the present invention. The present embodiment assumes a case where a ZC sequence or a GCL sequence is applied to an initial access ranging channel for initial access of an MS or a handover ranging channel for handover among ranging channels. However, this is for exemplary purposes only, and thus the ZC sequence or the GCL sequence can also be applied to a random access channel, a sounding channel, and a ranging channel for a synchronized MS.

In step S100, the MS receives ranging channel information from a BS.

The ranging channel information may be broadcast by using an SFH or the like. The ranging channel information may include information on a time domain and a frequency domain allocated to the ranging channel. In addition, the ranging channel information may include various types of parameters for generating a ranging preamble code constituting the ranging channel. Accordingly, the ranging channel information may include a parameter for a start root index $r_0$ among root indices usable in a cell, a parameter related to a cyclic shift value $N_{CS}$ or the number $N_{set}$ of candidate ranging preamble codes which are ranging preamble codes selectable in the cell. Although the parameters may be transmitted by the BS, some of the parameters may be predetermined to fixed values. For example, without signaling, $N_{set}$ may be set to 64 in a frequency division duplex (FDD) system, and may be set to 32 in a time division duplex (TDD) system.

When the parameter related to the start root index is transmitted among the parameters for generating the ranging preamble code, it is possible to decrease a signaling overhead. That is, rather than directly transmitting the start root index, the start root index may be transmitted by using only a half of all root indices according to a ZC sequence characteristic.

As one example, a ZC sequence with a length $N_{RP}=139$ may be used. In this case, 8 bits are required to transmit all root indices 1 to 138. However, since a ZC sequence with a root index r and a ZC sequence with a root index $N_{RP}-r$ have a pair allocation relation with each other, if only a half of all root indices (i.e., 1~69(($N_{RP}-1$)/2)) are transmitted among all root indices according to the proposed ranging preamble code generation method, all root indices can be represented only with 7 bits, not 8 bits. Further, only root indices 1 to 64 may be transmitted by using 6 bits, not 7 bits, and non-transmitted root indices may be allocated to dedicated codes. The dedicated code is a code allocated to a specific MS by a BS.

As another example, a ZC sequence with $N_{RP}=167$ may be used. In this case, 8 bits are required to transmit all possible root indices 1 to 166. However, if only a half of all root indices (i.e., 1 to 83(($N_{RP}-1$)/2)) are transmitted according to the proposed ranging preamble code generation method, all root indices can be represented with only 7 bits, not 8 bits. Further, only root indices 1 to 64 may be transmitted by using 6 bits, not 7 bits, and non-transmitted root indices may be allocated to dedicated codes.

In step S110, the MS arbitrarily generates one ranging preamble code from the candidate ranging preamble codes that can be selected in a cell. The MS may select any one region from time or frequency domains, and may determine at least one candidate ranging preamble code while increasing a root index in the selected region. For example, $N_{set}$ candidate ranging preamble codes can be determined based on a cyclic shift value $N_{CS}$ from a start root index $r_0$. More specifically, if it is assumed that a ZC sequence has a length $N_{ZC}=20$, a start root index $r_0=1$, a cyclic shift value $N_{CS}=10$, and a candidate ranging preamble code count $N_{set}=5$, then a 1st candidate ranging preamble code in which a ZC sequence with a root index 1 is not cyclic shifted and a 2nd candidate ranging preamble in which the ZC sequence with the root index 1 is cyclic shifted by 10 samples can be determined. Further, since a cyclic shift is no longer be able to be applied to the root index 1, the root index is converted to a root index 19 which has a pair allocation relation with the root index 1, and a 3rd candidate ranging preamble code in which a ZC sequence with the root index 19 is not cyclic shifted and a 4th candidate ranging preamble code in which the ZC sequence with the root index 19 is shifted by 10 samples can be determined. Since a cyclic shift is no longer be able to be applied to the root index 19, the root index is converted to a root index 2, and a 5th candidate ranging preamble code in which a ZC sequence with the root index 2 is not cyclic shifted can be determined. The MS generates any one ranging preamble code among the 1st to 5th candidate ranging preamble codes and transmits the generated ranging preamble code by using a ranging channel. The value $N_{set}$ can be defined to a different value in an initial access ranging channel or a handover ranging channel. Alternatively, one $N_{set}$ may be determined and then corresponding $N_{set}$ candidate ranging preamble codes may be respectively divided to a candidate ranging preamble code of the initial access ranging channel and a candidate ranging preamble code of the handover ranging channel. The MS selects any one ranging preamble code among candidate ranging preamble codes divided according to usage of the ranging channel, and transmits the selected ranging preamble code.

FIG. 9 shows an example of a process of determining a candidate ranging preamble code according to the proposed ranging preamble code generation method.

An example of the ranging preamble code based on the proposed ranging channel preamble code generation method can be defined by Equation 8. The ranging preamble code of Equation 8 is based on a ZC sequence in which a cyclic shift is applied.

$$x_p(k) = \exp\left(-j \cdot \pi \frac{r_p k(k+1) + 2 \cdot k \cdot s_p \cdot N_{CS}}{N_{RP}}\right), \quad \text{[Equation 8]}$$

$$k = 0, 1, \ldots, N_{RP} - 1$$

p denotes an index of a candidate ranging preamble code which is determined by performing a cyclic shift for $s_p$ times by $N_{CS}$ in a ZC sequence with a root index $r_p$. $r_p$ and $s_p$ can be defined by Equation 9 and Equation 10.

$$r_p = \begin{cases} r_0, & \text{if } p = 0 \\ N_{RP} - (r_0 + \lfloor \Gamma/2 \rfloor), & \text{if } \Gamma \text{ is odd} \\ \mod(r_0 + \Gamma/2, N_{RP}), & \text{if } \Gamma \text{ is even,} \end{cases} \quad \text{[Equation 9]}$$

$$p = 1, \ldots, N_{TOTAL} - 1$$

$$s_p = \begin{cases} 0, & \text{if } \mod(p/\lfloor N_{RP}/N_{CS} \rfloor, 1) = 0 \\ s_{p-1} + 1, & \text{otherwise,} \end{cases} \quad \text{[Equation 10]}$$

$$p = 0, 1, \ldots, N_{TOTAL} - 1$$

$r_0$ denotes information which is broadcast by using an SFH, and is $\Gamma = \lfloor p/\lfloor N_{RP}/N_{CS} \rfloor \rfloor$. $r_0$ is set to one of natural numbers in the range of 1 to $(n_{RP}-1)/2$ to decrease the number of bits transmitted by the BS. $\Gamma$ denotes a parameter for determining a root index used in a $p^{th}$ candidate ranging preamble code. If $p=0$ or $\Gamma=0$, a ZC sequence with a root index $r_0$ is used. When p is gradually increased to $\Gamma=1$ from 0, a ZC sequence with a root index $N_{RP}-(r_0+\lfloor \Gamma/2 \rfloor)=N_{RP}-r_0$ is used. That is, a root index when $\Gamma=0$ and a root index when $\Gamma=1$ have a pair allocation relation. When p is further increased to $\Gamma=2$, a ZC sequence with a root index $\mod(r_0+\Gamma/2, N_{RP})=r_0+1$ is used by Equation 9. When p is further increased to $\Gamma=3$, a ZC sequence with a root index $N_{RP}-(r_0+\lfloor \Gamma/2 \rfloor)=N_{RP}-(r_0+1)$ is used. Therefore, a root index when $\Gamma=2$ and a root index when $\Gamma=3$ also have a pair allocation relation. Along with the increase of p, a ranging preamble code based on a root index having a pair allocation relation can be used. $N_{TOTAL}$ is a sum of the number of candidate ranging preamble codes of an initial access ranging channel and the number of candidate ranging preamble codes of a handover ranging channel for each sector. $N_{CS}$ is a cyclic shift unit depending on a cell size. $N_{RP}$ is a length of a ranging preamble code. Each of the value $N_{CS}$ or $N_{RP}$ can be defined to a different value according to the ranging channel format defined in Table 2 or Table 3. Table 4 shows an example of the value $N_{CS}$ conforming to the ranging channel format of Table 2.

TABLE 4

| | Index | 0 | 1 | 2 | 3 | 4 | 5 | 6 | 7 |
|---|---|---|---|---|---|---|---|---|---|
| $N_{CS}$ | Format 0, 1, 2 | 12 | 16 | 27 | 37 | 48 | 58 | 69 | 0 |
| | Format 3 | 89 | 121 | 152 | 184 | 215 | 247 | 278 | 0 |

Although a ranging channel for a non-synchronized MS is assumed in the aforementioned embodiment, $N_{TOTAL}$ can be configured differently according to a type of the ranging channel transmitted in a sector. For example, if the initial access ranging channel, the handover ranging channel, and the ranging channel for the synchronized MS are all transmitted in the sector, $N_{TOTAL}$ may be a sum of the number $N_{IN}$ of candidate ranging preambles of the initial ranging channel, the number $N_{HO}$ of candidate ranging preamble codes of the handover ranging channel, and the number $N_{PE}$ of candidate ranging preamble codes of the ranging channel for the synchronized MS (i.e., $N_{TOTAL}=N_{IN}+N_{HO}+N_{PE}$). Alternatively, if the ranging channel for the synchronized MS is not transmitted, $N_{TOTAL}$ can be denoted by a sum of the number of candidate ranging preamble codes of the initial access ranging channel and the number of candidate ranging preamble codes of the handover ranging channel (i.e., $N_{TOTAL}=N_{IN}+N_{HO}$). Alternatively, if the ranging channel for the synchronized MS is not transmitted, $N_{TOTAL}$ may be fixed to a specific size and, within the range of $N_{TOTAL}$, the number of candidate ranging preamble codes of the initial access ranging channel and the number of candidate ranging preamble codes of the handover ranging channel can be adaptively modified. For example, when $N_{TOTAL}$ is fixed to 64 and the number of candidate preamble codes of the initial access ranging channel is $N_{IN}$, the number of candidate ranging preamble codes of the handover ranging channel may be $N_{HO}=64-N_{IN}$.

Hereinafter, various examples of a ranging preamble code based on the proposed ranging channel transmission method will be described.

Another example of the ranging preamble code based on the proposed ranging preamble code generation method can be defined by Equation 11. The ranging preamble code of Equation 11 is based on a ZC sequence which is cyclic shifted in a time domain and is defined in a frequency domain.

$$x_p(k) = \exp\left(-j \cdot \pi \frac{r_p \cdot k(k+1) + 2 \cdot k \cdot s_p \cdot N_{CS}}{N_{RP}}\right),$$ [Equation 11]

$$k = 0, 1, \ldots, N_{RP} - 1$$

p denotes an index of a candidate ranging preamble code which is determined by performing a cyclic shift for $s_p$ times by $N_{CS}$ in a ZC sequence with a root index $r_p$. $r_p$ and $s_p$ can be defined by Equation 12.

$$r_p = \mathrm{mod}((1 - 2 \cdot \mathrm{mod}(\lfloor p/M \rfloor, 2)) \cdot (\lfloor p/M \rfloor + r_0), N_{RP})$$ [Equation 12]
$$s_p = \mathrm{mod}(p, M)$$
$$p = 0, 1, \ldots, N_{TOTAL} - 1$$

A $p^{th}$ candidate ranging preamble code is determined by using an $s_p^{th}$ cyclic shift and a root index $r_p$ determined from a start root index $r_0$. $r_0$ may be pre-determined to one of natural values in the range of 1 to $(n_{RP}-1)/2$, or may be transmitted by the BS. Accordingly, a ZC sequence with a root index r and a ZC sequence with a root index $N_{RP}-r$ have a pair allocation relation with each other. $N_{TOTAL}$ denotes a total number of candidate ranging preamble codes of an initial access ranging channel and a handover ranging channel for each sector. Although it is assumed that $N_{TOTAL}$ includes only a contention-based preamble code allocated by the MS for convenience of explanation, a dedicated preamble code allocated by the BS may also be included. If $N_{TOTAL}$ also includes a dedicated preamble code, $N_{TOTAL}$ can be denoted by a sum of $N_{cont}$, which is the number of contention-based preamble codes, and $N_{dedi}$ which is the number of dedicated preamble codes. $N_{cont}$ can be denoted by a sum of $N_{IN}$, which is the number of candidate ranging preamble codes of the initial access ranging channel, and $N_{HO}$ which is the number of candidate ranging preamble codes of the handover ranging channel. $N_{dedi}$ may be less than or equal to 32.

$N_{CS}$ is a cyclic shift unit based on a cell size in the time domain, and can be defined as $N_{CS}=\lfloor N_{RP}/M \rfloor$. Herein, M denotes the number of codes which are cyclic shifted for each root index of a ZC sequence, and can be determined by Table 5.

TABLE 5

| Index | 0 | 1 | 2 | 3 |
|---|---|---|---|---|
| M | 1 | 2 | 4 | 8 |

$N_{RP}$ denotes a length of the ranging preamble code, and may have a value of 139 when the ranging channel has the format 0 of Table 3 and may have a value of 557 when the ranging channel has a format 1 of Table 3. The values $r_0$ and M and ranging preamble code partition information may be broadcast. The values $r_0$ and M and the ranging preamble code partition information may be broadcast by using an SFH, and in particular, may be transmitted by using an S-SFH SP1 with a period of 40 ms. The ranging preamble code partition information denotes the number of candidate ranging preamble codes of each ranging channel, and can be determined by Table 6. When the number of candidate ranging preamble codes of an initial access ranging channel, determined by the ranging preamble code partition information, is added to the number of candidate ranging preamble codes of a handover ranging channel, the aforementioned value $N_{TOTAL}$ can be obtained.

TABLE 6

| Partition Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Number of initial ranging preamble codes | 8 | 8 | 8 | 8 | 16 | 16 | 16 | 16 | 24 | 24 | 24 | 24 | 32 | 32 | 32 | 32 |
| Number of handover ranging preamble codes | 8 | 16 | 24 | 32 | 8 | 16 | 24 | 32 | 8 | 16 | 24 | 32 | 8 | 16 | 24 | 32 |

A signaling overhead can be reduced when transmission is performed by determining the start root index $r_0$ to any one of integers from 1 to $(N_{RP}-1)/2$ of Equation 11. For example, if $N_{RP}=139$, 8 bits are required when any one of root indices 1 to 138 is determined as the start root index. However, any one of root indices 1 to 69 consisting of 7 bits may be determined as the start root index by using a pair allocation relation similarly to the proposed ranging preamble code generation method. Alternatively, any one of root indices 1 to 64 consisting of 6 bits may be determined as the start root index, and the remaining root indices may be allocated to dedicated codes.

In addition, referring to Table 6, each sector or cell generates a ranging preamble code from a plurality of candidate ranging preamble codes, and thus can determine the start root index by using a less number of bits. In this case, instead of transmitting the start root index $r_0$, a start root index control parameter for determining the start root index is transmitted, and the start root index can be determined from the start root index control parameter.

For example, a root index can be allocated with an interval of x. In this case, the root index may be (1, x+1, 2x+1, ...). If it is assumed that x is an even number and the start root index control parameter is y for convenience of explanation, the start root index can be determined to $r_0=x/2*y+1$. The value x indicating the root index interval is divided by 2 because root indices having a pair allocation relation are simultaneously allocated. For example, when the root index is transmitted with an interval of 4, the start root index control parameter y has a length of 5 bits and may be set to $r_0=2y+1$ ($r_0=1, 3, 5, \ldots, 63$). Alternatively, when the root index is transmitted with an interval of 6, the start root index control parameter y has a length of 5 bits, and may be set to $r_0=3y+1$ ($r_0=1, 4, 7, \ldots, 94$). Alternatively, when the root index is transmitted with an interval of 8, the start root index control parameter y has a length of 4 bits, and may be set to $r_0=4y+1$ ($r_0=1, 5, 9, \ldots, 61$). Alternatively, when the root index is transmitted with an interval of 32, the start root index control parameter y has a length of 2 bits, and may be set to $r_0=16y+1$ ($r_0=1, 17, 33, 49$). When the ranging channel has the format 0 of Table 3, the root index may be transmitted with an interval of 8, and when the ranging channel has the format 1 of Table 3, the root index may be transmitted with an interval of 32.

As such, when only a specific root index is transmitted based on the start root index control parameter, a root index located in a center portion may not be used according to the number of codes which are cyclic shifted for each root index and the number of ranging preamble codes for each sector. For example, if $N_{RP}=139$ and the root index is transmitted with an interval of 8, the root index in use is (1,138,2,137,3, 136,4,135), (5,134,6,133,7,132,8,131), ..., (61,78,62,77,63, 76,64,75), and a root index located in the center portion and ranged from 65 to 74 is not used. In this case, a sequence based on the unused root index may be used as a dedicated code to be allocated by a BS to a specific MS, and in this manner, all sequences can be used. Alternatively, the root index located in the center portion may be used as a root index of a sequence for other usages rather than for the ranging channel. Examples of the usages may include an emergency call usage, a data relay usage, a femto cell usage, etc. Alternatively, to prevent the root index located in the center portion from not being used, the start root index control parameter may be configured with more bits. For example, when the root index is transmitted with an interval of 8, the start root index control parameter is configured with 5 bits, not 4 bits, so that more root indices ($r_0=1, 5, 9, \ldots, 125$) can be transmitted.

Another example of the ranging preamble code based on the proposed ranging preamble code generation method can be defined by Equation 13. The ranging preamble code of Equation 13 is based on a ZC sequence which is cyclic shifted in the time domain and is defined in the frequency domain.

$$x_p(k) = \exp\left(-j \cdot \pi \frac{r_p \cdot k(k+1) + 2 \cdot k \cdot s_p \cdot \lfloor N_{RP}/M \rfloor}{N_{RP}}\right), \quad \text{[Equation 13]}$$
$$k = 0, 1, \ldots, N_{RP}-1$$

p denotes an index of a candidate ranging preamble code which is determined by performing a cyclic shift for $s_p$ times by $N_{CS}$ in a ZC sequence with a root index $r_p$. $r_p$ and $s_p$ can be defined by Equation 14.

$$\left. \begin{array}{l} r_p = \mathrm{mod}((1 - 2 \cdot \mathrm{mod}(\lfloor p/M \rfloor, 2)) \cdot (\lfloor p/M/2 \rfloor + r_0), N_{RP}) \\ s_p = \mathrm{mod}(p, M) \end{array} \right\}, \quad \text{[Equation 14]}$$
$$p = 0, 1, \ldots, N_{TOTAL}-1$$

A $p^{th}$ candidate ranging preamble code is determined by using a root index $r_p$ determined from a start root index $r_0$ and a cyclic shift index $s_p$ using $N_{CS}$ as a cyclic shift unit. $r_0$ may be pre-determined to one of natural values in the range of 1 to $(n_{RP}-1)/2$, or may be transmitted by the BS. Accordingly, a ZC sequence with a root index r and a ZC sequence with a root index $N_{RP}-r$ have a pair allocation relation with each other. $N_{TOTAL}$ denotes a total number of candidate ranging preamble codes of an initial access ranging channel and a handover ranging channel for each sector. Although it is assumed that $N_{TOTAL}$ includes only a contention-based preamble code allocated by the MS for convenience of explanation, a dedicated preamble code allocated by the BS may also be included. M can be defined as $M=\lfloor N_{RP}/N_{CS}\rfloor$. M denotes the number of codes which are cyclic shifted for each root index of a ZC sequence, and can be determined by Table 5. $N_{CS}$ is a cyclic shift unit based on a cell size in the time domain, and can be defined as $N_{CS}=\lfloor N_{RP}/M\rfloor$. That is, if any one of values M and $N_{CS}$ is known, the other value can be calculated. $N_{RP}$ denotes a length of the ranging preamble code, and may have a value of 139 when it is determined that the ranging channel has the format 0 of Table 3 and may have a value of 557 when the ranging channel has the format 1 of Table 3. The values $r_0$ and M and ranging preamble code partition information may be broadcast. The ranging preamble code partition information denotes the number of candidate ranging preamble codes of each ranging channel, and can be determined by Table 6. When the number of candidate ranging preamble codes of an initial access ranging channel, determined by the ranging preamble code partition information, is added to the number of candidate ranging preamble codes of a handover ranging channel, the aforementioned value $N_{TOTAL}$ can be obtained.

A signaling overhead can be reduced when transmission is performed by determining the start root index $r_0$ to any one of integers ranted from 1 to $(N_{RP}-1)2$ of Equation 13. For example, if $N_{RP}=139$, 8 bits are required when any one of root indices 1 to 138 is determined as the start root index. However, any one of root indices 1 to 69 consisting of 7 bits may be determined as the start root index by using a pair allocation relation similarly to the proposed ranging preamble code generation method. Alternatively, any one of root indices 1 to 64 consisting of 6 bits may be determined as the start root index, and the remaining root indices may be allocated to dedicated codes.

In addition, the start root index may be determined by using a less number of bits. In this case, a start root index control parameter for determining the start root index is transmitted, and the start root index can be determined from the start root index control parameter. For example, when the root index is transmitted with an interval of 4, the start root index control parameter y has a length of 5 bits and may be set to $r_0=2y+1$ ($r_0=1, 3, 5, \ldots, 63$). Alternatively, when the root index is transmitted with an interval of 6, the start root index control parameter y has a length of 5 bits, and may be set to $r_0=3y+1$ ($r_0=1, 4, 7, \ldots, 94$). Alternatively, when the root index is transmitted with an interval of 8, the start root index control parameter y has a length of 4 bits, and may be set to $r_0=4y+1$ ($r_0=1, 5, 9, \ldots, 61$).

In addition, if a root index located in a center portion is not used according to the number of codes which are cyclic shifted for each root index and the number of ranging preamble codes for each sector, the root index located in the center portion may be used as a root index of a sequence for other usages rather than for the ranging channel. Alternatively, the root index located in the center portion may be used as a root index of a sequence for other usages rather than for the ranging channel. Examples of the usages may include an emergency call usage, a data relay usage, a femto cell usage, etc. Alternatively, to prevent the root index located in the center portion from not being used, the start root index control parameter may be configured with more bits. For example, when the root index is transmitted with an interval of 8, the start root index control parameter is configured with 5 bits, not 4 bits, so that more root indices ($r_0=1, 5, 9, \ldots, 125$) can be transmitted.

Another example of the ranging preamble code based on the proposed ranging preamble code generation method can be defined by Equation 15. The ranging preamble code of Equation 15 is based on a padded ZC sequence (or an extended ZC sequence) which is cyclic shifted in the frequency domain and is defined in the frequency domain. The ranging preamble code of Equation 15 can be used in the ranging channel for the synchronized MS.

$$c_p(k) = \exp\left(-j \cdot \pi \frac{r_p \cdot (k+m)(k+m+1)}{N_{RP}}\right), \qquad [\text{Equation 15}]$$

$$k = 0, 1, \ldots, N_{RP}-1$$

A padded ZC sequence with a length $N_{RP}+1$ is applied to the ranging preamble code of Equation 15. p denotes an index of a candidate ranging preamble code which is determined by performing a cyclic shift in a padded ZC sequence with a root index $r_p$. $r_p$ can be defined by Equation 16.

$$r_p=\mathrm{mod}((1-2\cdot\mathrm{mod}(p,2))\cdot(\lfloor p/2\rfloor+r_0),N_{RP}),p=0,1,\ldots,N_{TOTAL}-1 \qquad [\text{Equation 16}]$$

A $p^{th}$ candidate ranging preamble code is determined by using a root index $r_p$ determined from a start root index $r_0$. $r_0$ may be pre-determined to one of natural values in the range of 1 to $(n_{RP}-1)/2$, or may be transmitted by the BS. Accordingly, a ZC sequence with a root index r and a ZC sequence with a root index $N_{RP}-r$ have a pair allocation relation with each other. $N_{TOTAL}$ denotes a total number of candidate ranging preamble codes of the ranging channel for the synchronized MS for each sector. m denotes a cyclic shift unit in the frequency domain. $N_{RP}$ denotes a length of the ranging preamble code, and can be defined to $N_{RP}=71$ in the present embodiment.

A signaling overhead can be reduced when transmission is performed by determining the start root index $r_0$ to any one of integers ranged from 1 to $(N_{RP}-1)/2$ of Equation 15. Since $N_{RP}=71$, 7 bits are required when any one of root indices 1 to 70 is determined as the start root index. However, any one of root indices 1 to 35 (or 1 to 64) consisting of 6 bits may be determined as the start root index by using a pair allocation relation similarly to the proposed ranging preamble code generation method. Alternatively, any one of root indices 1 to 32 consisting of 5 bits may be determined as the start root index, and the remaining root indices may be allocated to dedicated codes.

In addition, the start root index may be determined by using a less number of bits. In this case, a start root index control parameter for determining the start root index is transmitted, and the start root index can be determined from the start root index control parameter. For example, when the root index is transmitted with an interval of 4, the start root index control parameter y has a length of 4 bits and may be set to $r_0=2y+1$ ($r_0=1, 3, 5, \ldots, 31$). Alternatively, when the root index is transmitted with an interval of 6, the start root index control parameter y has a length of 4 bits and may be set to $r_0=3y+1$ ($r_0=1, 4, 7, \ldots, 46$), or has a length of 3 bits and may be set to $r_0=3y+1$ ($r_0=1, 4, 7, \ldots, 22$). Alternatively, when the root index is transmitted with an interval of 8, the start root index control parameter y has a length of 3 bits and may be set to $r_0=4y+1$ ($r_0=1, 5, 9, \ldots, 29$), or has a length of 2 bits and may be set to $r_0=4y+1$ ($r_0=1, 5, 9, \ldots, 13$).

In addition, if a root index located in a center portion is not used according to the number of codes which are cyclic shifted for each root index and the number of ranging preamble codes for each sector, the root index located in the center portion may be used as a root index of a sequence for other usages rather than for the ranging channel. Alternatively, the root index located in the center portion may be used as a root index of a sequence for other usages rather than for the ranging channel. Examples of the usages may include an emergency call usage, a data relay usage, a femto cell usage, etc. Alternatively, to prevent the root index located in the center portion from not being used, the start root index control parameter may be configured with more bits. For example, when the root index is transmitted with an interval of 8, the start root index control parameter is configured with 4 bits or 3 bits, not 3 bits or 2 bits, so that more root indices ($r_0=1, 5, 9, \ldots, 61$, or $r_0=1, 5, 9, \ldots, 29$) can be transmitted.

Another example of the ranging preamble code based on the proposed ranging preamble code generation method can be defined by Equation 17. The ranging preamble code of Equation 17 is based on a padded ZC sequence which is cyclic shifted in the frequency domain and is defined in the frequency domain. The ranging preamble code of Equation 17 can be used in the ranging channel for the synchronized MS.

$$x_p(k) = \exp\left(-j \cdot \pi \frac{r_p \cdot (k + s_p \cdot m)(k + s_p \cdot m + 1)}{N_{RP}}\right),$$ [Equation 17]
$$k = 0, 1, \ldots, N_{RP} - 1$$

A padded ZC sequence with a length $N_{RP}+1$ is applied to the ranging preamble code of Equation 17. p denotes an index of a candidate ranging preamble code which is determined by performing a cyclic shift for $s_p$ times by $N_{CS}$ in a padded ZC sequence with a root index $r_p$. $r_p$ can be defined by Equation 18.

$$r_p = \mod((1 - 2 \cdot \mod(\lfloor p/\Gamma \rfloor, 2)) \cdot (\lfloor p/\Gamma/2 \rfloor + r_0), N_{RP})$$ [Equation 18]
$$s_p = \mod(p, \Gamma)$$
$$p = 0, 1, \ldots, N_{TOTAL} - 1$$

A $p^{th}$ candidate ranging preamble code is determined by using a root index $r_p$ determined from a start root index $r_0$. $r_0$ may be pre-determined to one of natural values in the range of 1 to $(n_{RP}-1)/2$, or may be transmitted by the BS. Accordingly, a ZC sequence with a root index r and a ZC sequence with a root index $N_{RP}-r$ have a pair allocation relation with each other. $\Gamma$ is defined as $\Gamma=\lfloor N_{RP}/m \rfloor$, and denotes a parameter for determining a root index used in a $p^{th}$ candidate ranging preamble code. $N_{TOTAL}$ denotes a total number of candidate ranging preamble codes of the ranging channel for the synchronized MS for each sector. Although it is assumed that $N_{TOTAL}$ includes only a contention-based preamble code allocated by the MS for convenience of explanation, a dedicated preamble code allocated by the BS may also be included. m denotes a cyclic shift unit in the frequency domain. $N_{RP}$ denotes a length of the ranging preamble code, and can be defined to $N_{RP}=71$ in the present embodiment.

A signaling overhead can be reduced when transmission is performed by determining the start root index $r_0$ to any one of integers ranged from 1 to $(N_{RP}-1)/2$ of Equation 17. Since $N_{RP}=71$, 7 bits are required when any one of root indices 1 to 70 is determined as the start root index. However, any one of root indices 1 to 35 (or 1 to 64) consisting of 6 bits may be determined as the start root index by using a pair allocation relation similarly to the proposed ranging preamble code generation method. Alternatively, any one of root indices 1 to 32 consisting of 5 bits may be determined as the start root index, and the remaining root indices may be allocated to dedicated codes.

In addition, the start root index may be determined by using a less number of bits. In this case, a start root index control parameter for determining the start root index is transmitted, and the start root index can be determined from the start root index control parameter. For example, when the root index is transmitted with an interval of 4, the start root index control parameter y has a length of 4 bits and may be set to $r_0=2y+1$ ($r_0=1, 3, 5, \ldots, 31$). Alternatively, when the root index is transmitted with an interval of 6, the start root index control parameter y has a length of 4 bits and may be set to $r_0=3y+1$ ($r_0=1, 4, 7, \ldots, 46$), or has a length of 3 bits and may be set to $r_0=3y+1$ ($r_0=1, 4, 7, \ldots, 22$). Alternatively, when the root index is transmitted with an interval of 8, the start root index control parameter y has a length of 3 bits and may be set to $r_0=4y+1$ ($r_0=1, 5, 9, \ldots, 29$), or has a length of 2 bits and may be set to $r_0=4y+1$ ($r_0=1, 5, 9, \ldots, 13$).

In addition, if a root index located in a center portion is not used according to the number of codes which are cyclic shifted for each root index and the number of ranging preamble codes for each sector, the root index located in the center portion may be used as a root index of a sequence for other usages rather than for the ranging channel. Alternatively, the root index located in the center portion may be used as a root index of a sequence for other usages rather than for the ranging channel. Examples of the usages may include an emergency call usage, a data relay usage, a femto cell usage, etc. Alternatively, to prevent the root index located in the center portion from not being used, the start root index control parameter may be configured with more bits. For example, when the root index is transmitted with an interval of 8, the start root index control parameter is configured with 4 bits or 3 bits, not 3 bits or 2 bits, so that more root indices ($r_0=1, 5, 9, \ldots, 61$, or $r_0=1, 5, 9, \ldots, 29$) can be transmitted.

Another example of the ranging preamble code based on the proposed ranging preamble code generation method can be defined by Equation 19. The ranging preamble code of Equation 19 is based on a padded ZC sequence. The ranging preamble code of Equation 19 can be used in the ranging channel for the synchronized MS.

$$x_p(n, k) = \exp\left(-j \cdot \pi\left(\frac{r_p(71 \cdot n + k)(71 \cdot n + k + 1)}{211} + \frac{2 \cdot k \cdot s_p \cdot N_{TCS}}{N_{FFT}}\right)\right),$$ [Equation 19]
$$k = 0, 1, \ldots, N_{RP} - 1; n = 0, 1, 2$$

p denotes an index of a candidate ranging preamble code constituting a basic unit of the ranging channel and is determined by performing a cyclic shift in a padded ZC sequence with a root index $r_p$. $r_p$ can be defined by Equation 20.

$$r_p = \mod\left(\begin{array}{l}(1 - 2 \cdot \mod(\lfloor p/M \rfloor, 2)) \cdot \\ (\lfloor p/M/2 \rfloor + r_0) + 211, 211\end{array}\right),$$ [Equation 20]
$$s_p = \mod(p, \Gamma)$$
$$p = 0, 1, \ldots, N_{TOTAL} - 1$$

A $p^{th}$ candidate ranging preamble code is determined by using a root index $r_p$ determined from a start root index $r_0$. $r_0$ may be pre-determined to one of natural values in the range of 1 to $(n_{RP}-1)/2$, or may be transmitted by the BS. Accordingly, a ZC sequence with a root index r and a ZC sequence with a root index $N_{RP}-r$ have a pair allocation relation with each other. M denotes the number of codes which are cyclic shifted for each root index of a ZC sequence, and can be determined as M=1/G. $N_{TOTAL}$ denotes a total number of candidate ranging preamble codes of the ranging channel for the synchronized MS for each sector. Regarding the contention-based ranging preamble code, $N_{TOTAL}$ can be determined by Table 7.

TABLE 7

| Index | $N_{TOTAL}$ |
| --- | --- |
| 0 | 8 |
| 1 | 16 |
| 2 | 24 |
| 3 | 32 |

$N_{TCS}$ is a cyclic shift unit in the time domain for each OFDM based on a CP length, and can be defined as $N_{TCS}=G*N_{FFT}$. G and $N_{FFT}$ can be defined by Table 1. $N_{RP}$ denotes a length of a ranging preamble code, and can be defined to $N_{RP}=71$ in the present embodiment. The start root index $r_0$ and ranging preamble code information may be broadcast by the BS. The ranging preamble code information can be defined by Table 7. The start root index and the ranging preamble code information may be broadcast by using a higher-layer message, or may be broadcast by using an S-SFH SP1 with a period of 40 ms.

A signaling overhead can be reduced when transmission is performed by determining the start root index $r_0$ to any one of integers ranged from 1 to $(N_{RP}-1)/2$ of Equation 19. Since $N_{RP}=71$, 7 bits are required when any one of root indices 1 to 70 is determined as a start root index. However, any one of root indices 1 to 35 (or 1 to 64) consisting of 6 bits may be determined as the start root index by using a pair allocation relation similarly to the proposed ranging preamble code generation method. Alternatively, any one of root indices 1 to 32 consisting of 5 bits may be determined as the start root index, and the remaining root indices may be allocated to dedicated codes.

In addition, the start root index may be determined by using a less number of bits. In this case, a start root index control parameter for determining the start root index is transmitted, and the start root index can be determined from the start root index control parameter. For example, when the root index is transmitted with an interval of 12, the start root index control parameter y has a length of 3 bits and may be set to $r_0=6y+1$ ($r_0=1, 7, 13, \ldots, 31$).

FIG. 10 shows the proposed ranging channel information transmission method according to an embodiment of the present invention.

In step S200, a BS configures ranging channel information. In step S210, the BS transmits the configured ranging channel information. A plurality of candidate ranging preamble codes are determined by the ranging channel information, and one of the plurality of candidate ranging preamble codes is generated as a ranging preamble code. In addition, the plurality of candidate ranging preamble codes are based on a ZC sequence of which a length is $N_{RP}$ and a root index is $r_p$. The ranging channel information includes at least one of a start root index $r_0$ among root indices of the plurality of candidate ranging preamble codes and a control parameter y indicating the start root index. Table 8 shows an exemplary S-SFH SP1 configuration when ranging channel information based on the proposed ranging preamble code generation method or the ranging channel information transmission method is broadcast by using the S-SFH SP1.

TABLE 8

| Syntax | Size (bit) | Notes |
| --- | --- | --- |
| Ranging channel allocation information | 4 | 2 bits: ranging-period, $P_R$<br>2 bits: subframe-offset, $O_{SF}$<br>2 bits: subband-offset, $k_0$ |
| Ranging preamble codes Information | 7 | 4 bits: root index, $r_0$<br>$r_0$ = 4 × signaled number + 1<br>(e.g., 1, 5, 9, . . . , 65)<br>3 bits: cyclic shift unit, $N_{CS}$ |
| Handover ranging preamble codes | 4 | Number of handover ranging preamble codes, O<br>O = 4 × (signaled number + 1)<br>(e.g., 4, 8, 12, . . . , 64) |
| Ranging channel format | 2 | 0b00: Ranging channel format 0<br>0b01: Ranging channel format 1<br>0b10: Ranging channel format 2<br>0b11: Ranging channel format 3 |

Table 9 shows an exemplary configuration of $P_R$, $O_{SF}$, and $k_0$ defined by Table 8.

TABLE 9

| Configurations | Ranging-period ($P_R$) | Ranging subframe |
| --- | --- | --- |
| 0 | 5 ms | $O_{SF}^{th}$ UL subframes of every frames ($0^{th}$, $1^{st}$, $2^{nd}$, and $3^{rd}$ frame of a superframe) |
| 1 | 10 ms | $O_{SF}^{th}$ UL subframes of every odd frames ($0^{th}$, $1^{st}$, $2^{nd}$, and $3^{rd}$ frame of a superframe) |
| 2 | 20 ms | $O_{SF}^{th}$ UL subframe of first frame within a superframe ($0^{th}$ frame of a superframe) |
| 3 | 40 ms | $O_{SF}^{th}$ UL subframe of first frame among two superframe ($0^{th}$ frame of odd superframes) |

In Table 9, a ranging subframe may denote an index of the allocated ranging subframe with the ranging channel formats 0, 1, and 2 of Table 2. Alternatively, the ranging subframe may denote a start index of the allocated ranging subframe with the ranging channel format 3 of Table 2.

Table 10 shows another exemplary S-SFH SP1 configuration when ranging channel information based on the proposed ranging preamble code generation method is broadcast by using the S-SFH SP1.

TABLE 10

| Syntax | Size (bit) | Notes |
| --- | --- | --- |
| Allocation periodicity | 2 | Indicates the periodicity of ranging channel allocation |
| Subframe offset | 2 | Indicates the subframe offset ($O_{SF}$) of ranging channel allocation ($0 \leq O_{SF} \leq 3$) |
| Start code information | 4 | Indicates the kns which is the parameter controlling the start root index of ranging preamble codes ($r_0$)<br>$r_0 = 4y + 1$ for ranging channel format 0 ($0 \leq y \leq 15$)<br>$r_0 = 16y + 1$ for ranging channel format 1 ($0 \leq y \leq 15$) |
| Ranging preamble code partition information | 4 | Indicates the number of initial and handover ranging preamble codes ($N_{IN}$ and $N_{HO}$) |
| Ranging preamble | 2 | Indicates the number of cyclic shifted |

TABLE 10-continued

| Syntax | Size (bit) | Notes |
|---|---|---|
| codes per root index | | codes per root index (M) for ranging preamble codes |
| Ranging channel formats | 1 | Indicates the ranging channel formats number |

In Table 10, a start root index of a ranging preamble code may be indicated by a start code information field. Instead of directly indicating or transmitting the start root index of the ranging preamble code, $r_0$ is determined by a start root index control parameter y, and thus the number of signaling bits for transmitting the start root index can be reduced. Further, a ranging preamble code partition information field may be determined by Table 6, and a ranging preamble codes per root index field may be determined by Table 5. Furthermore, a ranging channel format field may be determined by Table 3.

Figure 11:
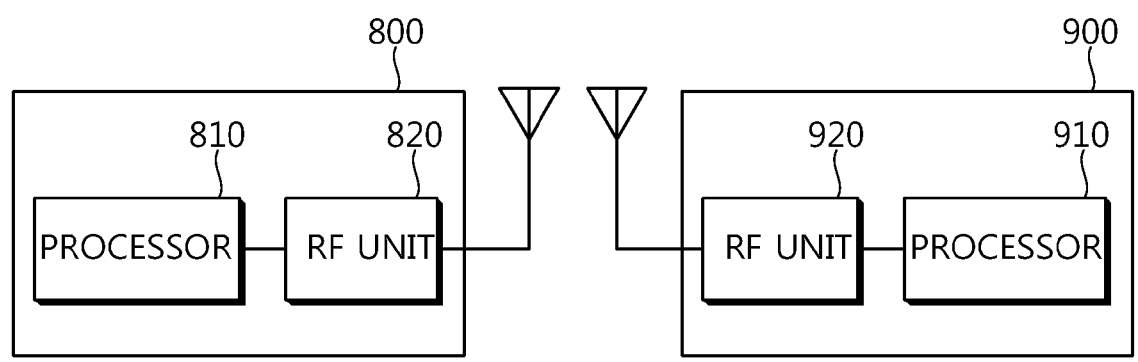
FIG. 11 is a block diagram of a BS and an MS for implementing an embodiment of the present invention.

FIG. 11 is a block diagram of a BS and an MS for implementing an embodiment of the present invention.

A BS 800 includes a processor 810 and a radio frequency (RF) unit 820. The processor 810 is coupled to the RF unit 820, and configures ranging channel information. The RF unit 820 transmits the ranging channel information to an MS 900.

The MS 900 includes a processor 910 and an RF unit 920. The RF unit 920 receives ranging channel information from the BS 800. The processor 910 is coupled to the RF unit 920, and generates one ranging preamble code among a plurality of candidate ranging preamble codes determined based on the ranging channel information. The plurality of candidate ranging preamble codes are based on a ZC sequence of which a length is $N_{RP}$ and a root index is $r_p$. The ranging channel information includes at least one of a start root index $r_0$ among root indices of the plurality of candidate ranging preamble codes and a control parameter y indicating the start root index. The ranging preamble code generation method proposed in FIG. 8 may be implemented by the MS 900 of FIG. 11. The ranging channel information transmission method proposed in FIG. 10 may be implemented by the BS 800 of FIG. 11. Further, the ranging preamble code proposed in Equation 8 to Equation 20 may be determined by the MS 900 of FIG. 11.

The present invention can be implemented using hardware, software, or a combination of them. In the hardware implementations, the present invention can be implemented using an Application Specific Integrated Circuit (ASIC), a Digital Signal Processor (DSP), a Programmable Logic Device (PLD), a Field Programmable Gate Array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of generating a ranging preamble code in a wireless communication system, the method comprising:
    receiving ranging channel information; and
    generating the ranging preamble code by selecting one of a plurality of candidate ranging preamble codes based on the ranging channel information,
    wherein each of the plurality of candidate ranging preamble codes is based on a Zadoff-Chu (ZC) sequence and has a length $N_{RP}$ and a root index $r_p$, and
    wherein the ranging channel information includes at least a start root index $r_0$ among root indices of the plurality of candidate ranging preamble codes or a control parameter y indicating the start root index, and
    wherein the ranging channel information is broadcast by using a secondary superframe header (S-SFH).

2. The method of claim 1, further comprising determining the root index $r_p$ of a candidate ranging preamble code among the plurality of candidate ranging preamble codes that has an index p and a cyclic shift index $s_p$ per root index according to the equation:

$$\left. \begin{array}{l} r_p = \mathrm{mod}((1 - 2 \cdot \mathrm{mod}(\lfloor p/M \rfloor, 2)) \cdot (\lfloor p/M/2 \rfloor + r_0), N_{RP}) \\ s_p = \mathrm{mod}(p, M) \end{array} \right\},$$

$$p = 0, 1, \ldots, N_{TOTAL} - 1,$$

wherein $N_{TOTAL}$ is a total number of candidate ranging preamble codes,
    wherein M is a number of codes that are cyclic shifted for each root index of the ZC sequence, and
    wherein $N_{RP}$ is a length of the candidate ranging preamble code.

3. The method of claim 2, further comprising determining $N_{TOTAL}$ as a sum of a contention-based candidate ranging preamble code count $N_{cont}$ determined by a mobile station and a dedicated ranging preamble code count $N_{dedi}$ allocated to a specific mobile station.

4. The method of claim 1, wherein:
    an initial value of $r_p$ is the start root index $r_0$; and
    $r_p$ is allocated in the order of $N_{RP}-r_0$, $r_0+1$, $N_{RP}-(r_0+1)$.

5. The method of claim 1, further comprising determining the start root index $r_0$ as either $r_0=4y+1$ or $r_0=16y+1$.

6. The method of claim 1, further comprising determining the start root index $r_0$ as $r_0=6y+1$.

7. The method of claim 1, wherein the control parameter y is an integer from 0 to 15.

8. The method of claim 1, further comprising determining a candidate ranging preamble code that has an index p among the plurality of candidate ranging preamble codes according to the equation:

$$x_p(k) = \exp\left(-j \cdot \pi \frac{r_p \cdot k(k+1) + 2 \cdot k \cdot s_p \cdot N_{CS}}{N_{RP}}\right), k = 0, 1, \ldots, N_{RP}-1,$$

wherein $r_p$ is a root index of the corresponding ZC sequence,
wherein $s_p$ is a cyclic shift index for each root index,
wherein $N_{CS}$ is a cyclic shift unit based on a cell size in a time domain and is defined as $N_{CS}=\lfloor N_{RP}/M \rfloor$,
wherein M is a number of codes that are cyclic shifted for each root index of the corresponding ZC sequence, and
wherein $N_{RP}$ is a length of the candidate ranging preamble code.

9. The method of claim 1, further comprising determining a candidate ranging preamble code that has index p among the plurality of candidate ranging preamble codes according to the equation:

$$x_p(n,k) = \exp\left(-j \cdot \pi \left(\frac{r_p \cdot (k+71n)(k+71n+1)}{211} + \frac{2k \cdot s_p \cdot N_{TCS}}{N_{FFT}}\right)\right),$$

$$k = 0, 1, \ldots, N_{RP}-1; n = 0, 1, 2$$

wherein $r_p$ is a root index of the corresponding ZC sequence,
wherein $s_p$ is a cyclic shift index for each root index,
wherein $N_{TCS}$ is a cyclic shift unit in a time domain for each orthogonal frequency division multiplexing (OFDM) symbol and is based on a cyclic prefix (CP) length, and
wherein $N_{FFT}$ is a fast Fourier transform (FFT) size based on a bandwidth.

10. The method of claim 1, further comprising transmitting a ranging channel comprising the generated ranging preamble code.

11. A method of transmitting ranging channel information in a wireless communication system, the method comprising:
configuring the ranging channel information; and
transmitting the ranging channel information,
wherein a plurality of candidate ranging preamble codes are determined according to the ranging channel information,
wherein one of the plurality of candidate ranging preamble codes is generated as a ranging preamble code,
wherein each of the plurality of candidate ranging preamble codes is based on a Zadoff-Chu (ZC) sequence and has a length $N_{RP}$ and a root index $r_p$, and
wherein the ranging channel information includes at least a start root index $r_0$ among root indices of the plurality of candidate ranging preamble codes or a control parameter y indicating the start root index, and
wherein the ranging channel information is broadcast by using a secondary superframe header (S-SFH).

12. The method of claim 11, further comprising determining the root index $r_p$ of a candidate ranging preamble code among the plurality of candidate ranging preamble codes that has an index p and a cyclic shift index $s_p$ per root index according to the equation:

$$\left.\begin{array}{l}r_p = \mathrm{mod}\left(\dfrac{(1-2\cdot\mathrm{mod}(\lfloor p/M \rfloor, 2))\cdot}{(\lfloor p/M/2 \rfloor + r_0)}, N_{RP}\right) \\ s_p = \mathrm{mod}(p, M)\end{array}\right\}, p = 0, 1, \ldots, N_{TOTAL}-1,$$

wherein $N_{TOTAL}$ is a total number of candidate ranging preamble codes,
wherein M is a number of codes that are cyclic shifted for each root index of the ZC sequence, and
wherein $N_{RP}$ is a length of the candidate ranging preamble code.

13. The method of claim 11, further comprising determining $N_{TOTAL}$ as a sum of a contention-based candidate ranging preamble code count $N_{cont}$ determined by a mobile station and a dedicated ranging preamble code count $N_{cont}$ allocated to a specific mobile station.

14. The method of claim 11, wherein:
an initial value $r_p$ is the start root index $r_0$; and
$r_p$ is allocated in the order of $N_{RP}-r_0$, $r_0+1$, $N_{RP}-(r_0+1)$.

15. The method of claim 11, further comprising determining the start root index $r_0$ as either $r_0=4y+1$ or $r_0=16y+1$.

16. The method of claim 11, further comprising determining the start root index $r_0$ as $r_0=6y+1$.

17. The method of claim 11, wherein the control parameter y is an integer from 0 to 15.

18. An apparatus for generating a ranging preamble code in a wireless communication system, the apparatus comprising:
a radio frequency (RF) unit configured to receive ranging channel information; and
a processor coupled to the RF unit and configured to generate the ranging preamble code by selecting one of a plurality of candidate ranging preamble codes based on the ranging channel information,
wherein each of the plurality of candidate ranging preamble codes based on a Zadoff-Chu (ZC) sequence and has a length $N_{RP}$ and a root index $r_p$,
wherein the ranging channel information includes at least a start root index $r_0$ among root indices of the plurality of candidate ranging preamble codes or a control parameter y indicating the start root index, and
wherein the ranging channel information is broadcast by using a secondary superframe header (S-SFH).

* * * * *